(12) United States Patent
Ogawa

(10) Patent No.: US 7,164,544 B2
(45) Date of Patent: Jan. 16, 2007

(54) OPTICAL SYSTEM AND OPTICAL APPARATUS INCLUDING THE SAME

(75) Inventor: Hideki Ogawa, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/450,593

(22) Filed: Jun. 8, 2006

(65) Prior Publication Data

US 2006/0285229 A1 Dec. 21, 2006

(30) Foreign Application Priority Data

Jun. 15, 2005 (JP) .............................. 2005-175496

(51) Int. Cl.
*G02B 9/00* (2006.01)

(52) U.S. Cl. ...................... 359/754; 359/793; 359/795

(58) Field of Classification Search ................ 359/754, 359/757, 761, 793, 795

See application file for complete search history.

(56) References Cited

U.S. PATENT DOCUMENTS

| 4,241,983 A | 12/1980 | Kitagishi |
| 4,348,084 A | 9/1982 | Kitagishi |
| 5,629,799 A | 5/1997 | Maruyama et al. |
| 5,638,215 A | 6/1997 | Neil |
| 5,731,907 A | 3/1998 | Sigler |
| 5,790,321 A | 8/1998 | Goto |
| 6,115,188 A | 9/2000 | Nishio et al. |

FOREIGN PATENT DOCUMENTS

| JP | 55-36886 A | 3/1980 |
| JP | 55-147606 A | 11/1980 |
| JP | 6-324262 A | 11/1994 |
| JP | 6-331887 A | 12/1994 |
| JP | 11-119092 A | 4/1999 |

*Primary Examiner*—Timothy Thompson
*Assistant Examiner*—Jerry Fang
(74) *Attorney, Agent, or Firm*—Canon U.S.A., Inc. Intellectual Property Division

(57) ABSTRACT

At least one exemplary embodiment is directed to a telephoto type optical system capable of reliably correcting and/or reducing aberrations such as chromatic aberration. The optical system includes a refractive optical element which includes a solid-state material, a negative lens component and a positive lens component, respectively disposed on a front side relative to a pupil, the solid-state material meeting conditions of an Abbe number vd(GNL) and of a partial dispersion ratio θgF(GNL) as follows:

$-2.100 \times 10^{-3} \cdot vd(GNL) + 0.693 < \theta gF(GNL)$ $0.555 < \theta gF(GNL) < 0.9$ Then, a refractive power of the refractive optical element, a mean partial dispersion ratio of a material of the negative lens component, and a mean Abbe number of a material of the positive lens component are properly set.

10 Claims, 8 Drawing Sheets

OPTICAL SYSTEM AND OPTICAL APPARATUS INCLUDING THE SAME

BACKGROUND OF THE INVENTION

1. Field of the Invention

The present invention relates to an optical system and a photographic device including the optical system.

2. Description of the Related Art

Generally, with the optical system applied to the photographic device such as the digital camera or the video camera, the more an overall length of the lens system (overall optical length, i.e., length between a surface of a first lens on an object side and an image plane) is shortened to downsize the entire optical system, the more aberrations, for example longitudinal chromatic aberration and lateral chromatic aberration, are generated, thus degrading the optical performance. In particular, a telephoto type optical system, in which the overall length of the optical system is shortened, causes more chromatic aberrations to be generated such as when a focal length is lengthened.

For reducing the generation of such chromatic aberrations, there is generally known a method using an extraordinary partial dispersion material for an optical material, and a method using a diffractive optical element in an optical path.

In the telephoto type optical system, the chromatic aberration is generally reduced by using a lens having a positive refractive power composed of a low dispersion optical material having extraordinary partial dispersion such as a fluorite and a lens having a negative refractive power composed of a high dispersion optical material, by respectively disposed in a front lens group, at which a paraxial marginal ray and a paraxial chief ray pass through positions relatively higher than a position of an optical axis (refer to Japanese Patent Publication No. 60-49883, which corresponds to U.S. Pat. No. 4,241,983; Japanese Patent Publication No. 60-55805, which corresponds to U.S. Pat. No. 4,348,084; and Japanese Patent Laid-Open No. 11-119092, which corresponds to U.S. Pat. No. 6,115,188).

The paraxial marginal ray, by the definition when the focal length of the entire optical system is normalized to 1, is a paraxial ray incident in parallel to the optical axis of the optical system with a height of 1 from the optical axis. The paraxial chief ray, by the definition when the focal length of the entire optical system is normalized to 1, is a paraxial ray passing an intersection point of an entrance pupil and the optical axis of the optical system from among rays incident by −45° relative to the optical axis. The incident angle of the ray to the optical system is assumed to be positive in the clockwise direction, or negative in the counterclockwise direction when measured relative to the optical axis. Assume that an object is on the left side of the optical system, and the ray incident on the optical system from the object side is advanced to the right side from the left side.

Alternatively, there is known an optical system which corrects and/or reduces the chromatic aberrations in the telephoto type optical system with the use of the diffractive optical element without use of the optical material having the extraordinary partial dispersion. Japanese Patent Laid-Open No. 6-324262, which corresponds to U.S. Pat. No. 5,790,321; and Japanese Patent Laid-Open No. 6-331887, which corresponds to U.S. Pat. No. 5,629,799 discuss a telephoto type optical system with a F-number of about F2.8, the optical system correcting and/or reducing the chromatic aberration relatively reliably by combining the diffractive optical element and a refractive optical element.

Still alternatively, a liquid-state material having a relatively high dispersion characteristic and a relatively extraordinary partial dispersion characteristic is known as an optical material capable of correcting and/or reducing the chromatic aberration, the characteristic being related to the optical characteristic of the diffractive optical element, and an achromatic optical system using the liquid-state material is suggested in U.S. Pat. No. 5,731,907 and U.S. Pat. No. 5,638,215.

The telephoto type optical system discussed in Japanese Patent Publication No. 60-49883, which corresponds to U.S. Pat. No. 4,241,983; Japanese Patent Publication No. 60-55805, which corresponds to U.S. Pat. No. 4,348,084; and Japanese Patent Laid-Open No. 11-119092, which corresponds to U.S. Pat. No. 6,115,188 using the fluorite for the optical material can easily correct the chromatic aberration when the overall length of the lens system is set relatively long.

However, the shorter the overall length of the lens system is set, the more the chromatic aberrations are generated; it can be difficult to reliably correct the chromatic aberrations. Because the method merely reduces the chromatic aberration generated in the front lens system having the positive refractive power by using the low dispersion characteristic and the extraordinary partial dispersion characteristic owned by the material such as the fluorite. When the chromatic aberration, which increases along with the shortening of the overall length of the lens system, is intended to be reduced, in a case of a lens for instance using a low dispersion glass with a large Abbe number such as the fluorite, the chromatic aberration can not remarkably be changed if the refractive power of a lens surface is largely changed.

Accordingly, the correction and/or reduction of the chromatic aberration is hard to be correlated with correction of other aberrations such as spherical aberration, coma and astigmatism generated when the refractive power is largely changed.

Meanwhile, as the diffractive optical element has a sufficient correction effect for the chromatic aberration, it however, generates a diffractive light having an unnecessary order of diffraction, which is not a designated order of diffraction.

Since the material discussed in U.S. Pat. No. 5,731,907 and U.S. Pat. No. 5,638,215 is in liquid state, a structure for sealing the liquid is necessary, and is difficult to be manufactured in the case of application to the optical material. In addition, a characteristic such as a refractive index and dispersion can be varied with temperature, thus resulting in insufficient environment resistance. Further, since the Abbe number is relatively large and the extraordinary partial dispersion is relatively small, as well as a boundary for the air is not provided, a sufficient correction effect of the chromatic aberration is hardly obtained.

SUMMARY OF THE INVENTION

The present invention is directed to an optical system such as a silver salt film camera, a digital still camera, a video camera, a telescope, binoculars, a projector or a copier and other optical systems as known by one of ordinary skill in the relevant arts and equivalents.

The present invention is directed to an optical system capable of reliably correcting and/or reducing aberrations such as chromatic aberration, and an optical apparatus including the optical system.

According to an aspect of the present invention, an optical system, which can be a telephoto type optical system, includes a refractive optical element which includes a solid-state material, a negative lens component including at least one negative lens element, and a positive lens component including at least one positive lens element, respectively on a front side relative to a pupil.

An Abbe number vd(GNL) and a partial dispersion ratio θgF(GNL) of the solid-state material of the above-described refractive optical element can meet the following conditions of:

$$-2.100 \times 10^{-3} \cdot vd(GNL) + 0.693 < \theta gF(GNL)$$

$$0.555 < \theta gF(GNL) < 0.9$$

Then, when a refractive power of the refractive optical element is ψ(GNL), a mean partial dispersion ratio of a material of the negative lens component is θgF(N), a mean Abbe number of a material of the positive lens component is vd(P), and a refractive power of the entire system is ψ, the following conditions can be met:

$$0.03 < (GNL)/\psi < 7.5$$

$$0.55 < \theta gF(N) < 0.635$$

$$vd(P) < 75$$

Incidentally, the position of the pupil corresponds to: a position of an aperture stop; or an intersection point of an optical axis and a paraxial chief ray.

In addition, the telephoto type corresponds to: an optical system in which a maximum value of a height from the optical axis, at which a paraxial marginal ray passes through lens surfaces on the front side relative to the intersection point P of the optical axis and the paraxial chief ray, is larger than a maximum value of a height from the optical axis, at which the paraxial marginal ray passes through lens surfaces on a rear side relative to the intersection point P; or an optical system in which an overall optical length is shorter than a focal length.

Further features of the present invention will become apparent from the following description of exemplary examples with reference to the attached drawings.

DESCRIPTION OF THE EMBODIMENTS

Figure 1:
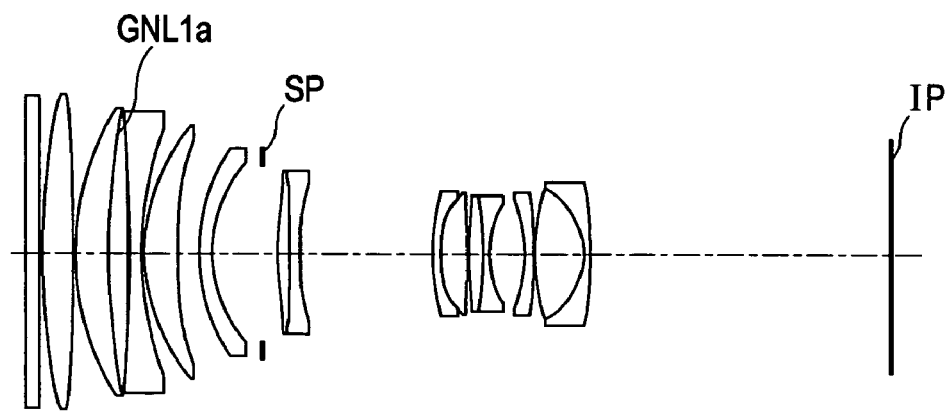
FIG. 1 is a cross section of an optical system according to Numerical Example 1 in accordance with at least one exemplary embodiment.

The following description of at least one exemplary embodiment is merely illustrative in nature and is in no way intended to limit the invention, its application, or uses.

Processes, techniques, apparatus, and materials as known by one of ordinary skill in the relevant art may not be discussed in detail but are intended to be part of the enabling description where appropriate, for example the fabrication of the lens elements and their materials.

In all of the examples illustrated and discussed herein any specific values, for example Abbe number values, should be interpreted to be illustrative only and non limiting. Thus, other examples of the exemplary embodiments could have different values.

Notice that similar reference numerals and letters refer to similar items in the following figures, and thus once an item is defined in one figure, it may not be discussed for following figures.

Note that in the aberration diagrams the Y-axis in the spherical aberration's graph is entrance pupil radius, the Y-axis in the astigmatism's, distortion's and chromatic aberration of magnification's graphs is image height.

Firstly, a feature of a dispersion characteristic of an optical material used in an optical system according to at least one exemplary embodiment will be described below prior to the explanation of a configuration of the optical system.

In a wavelength characteristic (dispersion characteristic) of a refractive index of the optical material, the Abbe number indicates an entire gradient of a dispersion characteristic curve, and a partial dispersion ratio indicates the degree of curvature of the dispersion characteristic curve.

Generally, according to the optical material, a refractive index on a short wavelength side is higher than a refractive index on a long wavelength side (i.e., the Abbe number shows a positive value), the dispersion characteristic curve shows a locus of a downwardly projecting shape (i.e., the partial dispersion ratio shows a positive value), and the refractive index varies largely relative to the variation of the wavelength as being shifted to the short wavelength side.

In addition, the smaller Abbe number and the higher dispersion the optical material has, a larger partial dispersion ratio the optical material shows, and the dispersion characteristic curve tends to project further downwardly.

With the optical material having the large partial dispersion ratio, a wavelength dependent characteristic curve of a chromatic aberration coefficient of a lens surface using such material shows a large curvature on the short wavelength side compared to that using an optical material having the small partial dispersion ratio.

On the other hand, according to the optical material having the small partial dispersion ratio, the wavelength dependent characteristic curve of a chromatic aberration coefficient of a lens surface using such material shows a substantially linear shape over a usable wavelength band.

The partial dispersion ratio of a typical optical material such as a glass member shows substantially linear distribution relative to the Abbe number, and the optical material having the characteristic deviated from the line is the optical material having the extraordinary partial dispersion.

As for the optical material having the extraordinary partial dispersion, a material having a relatively high partial dispersion ratio of a fluorocarbon type for instance a fluorite or a UD glass is known as a typical material having the low dispersion, while a material of a short flint type or a part of a lanthanum type having relatively low partial dispersion ratio is known as a typical material having the high dispersion. The dispersion ratios of these glass members are disposed in a vicinity of the linear shape.

Next, a general application method of such typical material having the extraordinary partial dispersion to a photographic optical system will be described below.

In many of the photographic optical systems such as a telephoto lens, the optical system has a positive refractive power as the entire optical system. Owing to this, the optical system generally employs positive lenses (having positive refractive powers) more than negative lenses (having negative refractive powers).

At this time, according particularly to a telephoto lens of the telephoto type, the chromatic aberration of the entire optical system is mainly generated by a lens group on a front side (on an object side according to the photographic optical system, or on an enlargement side according to a liquid crystal projector) relative to an aperture stop.

As for a configuration of the lens group on the object side relative to the aperture stop of the telephoto lens, the positive lenses (with the great number) selectively employ materials having low dispersion for reducing the gradient of the entire wavelength characteristic curve of the chromatic aberration coefficient, whereas the negative lenses (with the small number) selectively employ materials having high dispersion. Then, appropriate refractive powers are applied to the positive lenses and the negative lenses, so as to cancel the gradient of the entire wavelength characteristic curve of the chromatic aberration coefficient integrated by the positive lenses respectively composed of the low dispersion materials.

Further, in view of the curvature of the wavelength characteristic of the chromatic aberration coefficient, the positive lenses composed of the low dispersion materials, selectively employ materials having relatively high partial dispersion ratios compared to the typical low dispersion materials. And the negative lenses composed of the high dispersion materials selectively employ materials having relatively low partial dispersion ratios compared to the typical high dispersion materials. Accordingly, the curvature of the wavelength characteristic curve of the chromatic aberration coefficient integrated by the positive lenses respectively composed of the low dispersion materials is canceled.

In other words, the positive lens selectively employs the material of the fluorocarbon type having the low dispersion and the relatively high partial dispersion ratio, for instance, the fluorite or the UD glass. And the negative lens selectively employs the material having the high dispersion and the relatively low partial dispersion ratio, for instance, a material of the short flint type or a part of the lanthanum type. Accordingly, the gradient and the curvature of the wavelength characteristic curve of the chromatic aberration of the entire optical system can be balanced.

However, only with the combination of the typical materials having the extraordinary partial dispersion, in many of the photographic optical systems such as the telephoto lens, the curvature of the wavelength characteristic of the chromatic aberration coefficient caused by the large curvature of the dispersion characteristic of the negative lenses overcorrects the curvature integrated by the positive lenses.

Consequently, according to the wavelength characteristic curve of a longitudinal chromatic aberration coefficient of the entire optical system, the chromatic aberration is remained as a so-called achromatic curve projecting upward.

This residual chromatic aberration enhances the refractive power of the lens of the optical system and expands when the overall length of the lens system is shorten; it can then be difficult to correct and/or reduce the chromatic aberration as far as the above-described typical application method using the typical extraordinary partial dispersion material that is typically employed.

Next, an application method of a diffractive optical element to the photographic optical system, which is effective for correcting and/or reducing chromatic aberration, will be described below.

The typical optical material constantly holds a positive Abbe number as described above, and the dispersion characteristic curve usually projects downward.

On the other hand, according to the diffractive optical element, a refractive index (equivalent value) on the long wavelength side is higher than a refractive index (equivalent value) on the short wavelength side, and the Abbe number (equivalent value) holds a negative value as −3.45. In addition, the refractive index (equivalent value) of the diffractive optical element varies uniformly relative to the wavelength, so that diffractive optical element shows a linear dispersion characteristic, which represents a super-high dispersion and a super-low partial dispersion ratio.

Consequently, the wavelength characteristic of the chromatic aberration coefficient also becomes thoroughly linear; the gradient thereof can be freely controlled with the linear state maintained, by varying the power of the diffractive optical element.

The configuration of the refractive optical element is only required to form a linear state with the gradient being completely ignored, corresponding to the linearity of the wavelength characteristic of the aberration coefficient of the diffractive optical element, and residual gradient can be corrected by controlling the power of the diffractive optical element.

At this time, since the diffractive optical element has the super-high dispersion, the power variation of the diffractive optical element hardly affects the aberrations such as the spherical aberration, thereby enhancing the independency of the correction of the chromatic aberration.

As for the specific configuration of the optical system including the refractive optical element for enhancing the linearity of the wavelength characteristic of the chromatic aberration coefficient, the positive lens and the negative lens are only required to selectively employ materials in an inverse manner relative to the general application method described above with use of the typical extraordinary partial dispersion materials.

In other words, with the dispersion ignored, the positive lens employs the material having the high dispersion ratio (consequently, being close to the high dispersion) so as to cancel the curvature of the wavelength characteristic curve of the chromatic aberration coefficient of the negative lens. Alternatively, the negative lens employs the material having the low partial dispersion ratio (consequently, being close to the low dispersion) so as to cancel the curvature of the wavelength characteristic curve of the chromatic aberration coefficient of the positive lens. Still alternatively, both the positive lens and negative lens can reselect the materials to cancel the curvatures.

Here, the sign of the power to be applied to the diffractive optical element for canceling the chromatic aberration coefficient of the refractive optical element, for example for the telephoto lens, is required to be positive while disposed on the object side relative to the aperture stop in order to cancel the longitudinal chromatic aberration coefficient as well as the lateral chromatic aberration coefficient.

In the above, the well-known method of correcting and/or reducing the chromatic aberration was described.

Namely, in a case of the telephoto lens, in the lens group on the object side relative to the aperture stop, the positive refractive power is applied to the lens composed of the material having the low dispersion and the relatively high partial dispersion ratio of the fluorocarbon type such as the fluorite or the UD glass. Then, the negative refractive power can be applied to the lens which includes the material of the short flint type or a part of the lanthanum type having the high dispersion and the relatively low partial dispersion ratio.

Heretofore, there were described the method for reducing the gradient and the curvature of the wavelength characteristic curve of the chromatic aberration and the method for canceling the gradient and the curvature of the wavelength characteristic curve of the chromatic aberration by applying the positive power to the diffractive optical element disposed on the object side relative to the aperture stop and corresponding to the super-high dispersion and the super-low partial dispersion ratio.

However, in the related art, there is no exemplary configuration of correcting and/or reducing the chromatic aberration in a proactive manner by using the material of the super-high partial dispersion ratio for achromatizing the telephoto lens.

The optical system according to at least one exemplary embodiment specifies conditions of a partial dispersion ratio and conditions of a proper optical arrangement, which are effective for achromatizing, according to a method completely different from the method of correcting and/or reducing the chromatic aberration in the related art.

Next, a longitudinal chromatic aberration coefficient will be described below, according to a super-telephoto lens as a non limiting example which will be described below. The super-telephoto lens is constituted from a refractive optical element GNL, which includes the material which can have the super-high partial dispersion ratio, and a refractive optical part G which includes the material other than that material. Note that formulas and statements referring to optical element GNL are equally applicable to the numerical examples of the optical element GNLa-g.

Assume that, the refractive optical part G is corrected or error reduced for the chromatic aberration in some measure as a subsystem.

At this time, the wavelength characteristic curve of the longitudinal chromatic aberration curves in an upwardly projecting manner can be in a so-called achromatic state.

With this state, the negative lens of the refractive optical part G selectively employs the material, which can have the high dispersion and the relatively low partial dispersion ratio as described above, whereas the positive lens selectively employs the material, which can have the low dispersion and the relatively high partial dispersion ratio.

If the negative lens selects the material, which can have a characteristic relatively close to the high partial dispersion ratio, since the material, which can have the high dispersion ratio also has the high dispersion, the wavelength characteristic curve of the chromatic aberration coefficient of the refractive optical part G curves to project further upwardly compared to the original state, and entirely inclines such that the chromatic aberration coefficient on the short wavelength side is shifted in a negative direction.

Then, if the positive refractive power can be applied to the refractive optical element GNL using the material having the super-high partial dispersion ratio, the wavelength characteristic curve of the chromatic aberration coefficient of the refractive optical element GNL curves to project further downwardly, entirely inclines such that the chromatic aberration coefficient on the short wavelength side is shifted in a positive direction, and becomes substantially symmetrical relative to the wavelength characteristic curve of the chromatic aberration coefficient of the refractive optical part G and a wavelength axis, while the certain refractive power being maintained.

However, in many cases, since the gradient and the curvature of the entire wavelength characteristic curve of the chromatic aberration coefficient hardly show the symmetrical appearance contemporaneously, the refractive power of the refractive optical element GNL is controlled to cancel the curvature, and the entire residual gradient is canceled and/or reduced by reselecting the material of the positive lens of the refractive optical part G.

In other words, since the positive lens of the refractive optical part G is the material, which can have a characteristic close to the low dispersion, the partial dispersion ratio shows a small absolute value compared to the partial dispersion ratio of the material, which can have a characteristic close to the high dispersion. Therefore, if the used material is changed to the other material having the similar characteristic, the entire gradient can be corrected and/or reduced while almost no influence is given to the curvature of the wavelength characteristic curve of the chromatic aberration coefficient.

Note that in examples of the optical systems according to at least one exemplary embodiment, the positive lens of the refractive optical part G selects the material, which can have a characteristic relatively close to the high dispersion, so that the chromatic aberration coefficient on the short wavelength side of the refractive optical part G is shifted in the positive direction.

As described above, the optical system according to at least one exemplary embodiment enhances, on the object side relative to the aperture stop (on the enlargement side relative to the point P), the curvature of the wavelength characteristic curve of the chromatic aberration coefficient by employing the material, which can have the high dispersion (consequently being the high partial dispersion ratio) for the negative lens of the refractive optical part G. Then the refractive optical element GNL (FIG. 15) with the positive refractive power applied is disposed on the object side relative to the aperture stop so as to cancel the curvature. In addition, the entire residual gradient is canceled by changing the material of the positive lens on the object side relative to the aperture stop (on the enlargement side relative to the point P). Thereby the chromatic aberration of the entire system can be reliably connected.

Next, examples of the optical systems and an optical apparatus including the optical system according to at least one exemplary embodiment will be described below.

The optical system according to at least one exemplary embodiment can be applied to a photographic device such as a digital camera, a video camera or a silver salt film camera; an observation device such as a telescope or binoculars; or equipment such as a copier or a projector or other optical devices as known by one of ordinary skill in the relevant arts and equivalents. The optical system according to at least one exemplary embodiment employs the telephoto type (optical system with an overall length of the lens system being shorter than a focal length), and uses the refractive optical element in which a refractive effect can be applied to the solid-state material, which can have the high dispersion and the low partial dispersion ratio.

Note that the solid-state material of the refractive optical element used for the optical system of at least one exemplary embodiment is a material which is in a solid state in use of the optical system, and can be any state prior to the use of the optical system such as in manufacturing. For example, a solid-state material, which is a liquid-state material in manufacturing and becomes the solid-state material by curing, can be applicable.

Figure 15:
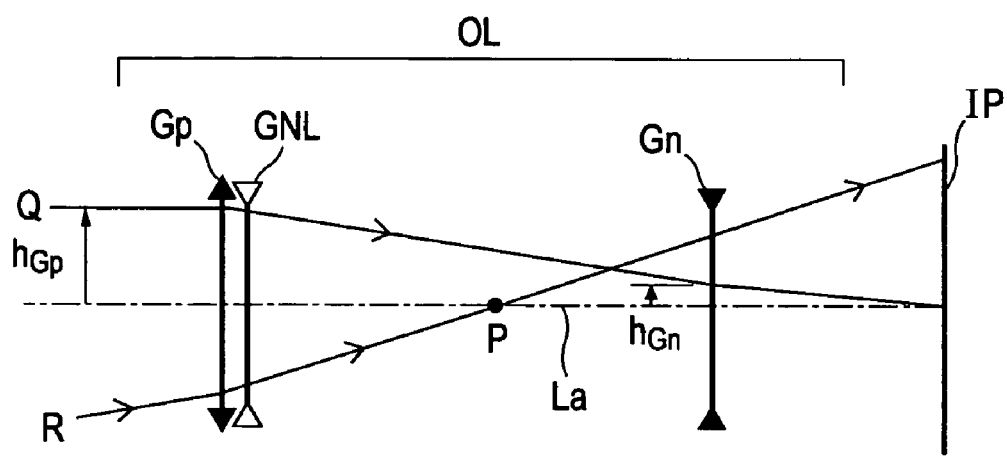
FIG. 15 is a schematic illustration showing a paraxial arrangement for explaining an optical effect of the optical system according to at least one exemplary embodiment.

FIG. 15 is a schematic illustration showing a paraxial arrangement of the refractive power for explaining an optical effect of the optical system according to at least one exemplary embodiment. In FIG. 15, OL denotes a telephoto type optical system in which the overall length of the lens system (distance between a first lens surface and an image plane) is shorter than the focal length. Gp, Gn denote a front unit, which can have a positive refractive power and a rear unit, which can have a negative refractive power, respectively, forming the telephoto type optical system OL.

GNL denotes a refractive optical element applied to the front unit Gp, the refractive optical element including a material which can meet the following Conditional Expressions (1) to (8).

To simplify the configuration, assume that all the lenses forming the front unit Gp and the rear unit Gn are single thin lenses, and the lenses are disposed on the optical axis at intervals of 0, respectively in the front unit Gp and in the rear unit Gn.

In addition, assume that the refractive optical element GNL is also a single thin lens, and is disposed on the optical axis La in the front unit Gp at an interval of 0. Q denotes a paraxial marginal ray, R denotes a paraxial chief ray, P denotes an intersection point of the paraxial chief ray R and the optical axis La, and IP denotes an image plane.

The optical system OL shown in FIG. 15 is an optical system in which a maximum height hGp from the optical axis La on the enlargement side (object side) relative to the point P where the optical axis La intersects with the paraxial chief ray R, at which the paraxial marginal ray Q passes through lens surfaces, is greater than a maximum height hGn from the optical axis on the contraction side (image side) relative to the point P, at which the paraxial marginal ray Q passes through lens surfaces.

The Abbe number and the partial dispersion ratio of the optical member used for the optical system of examples are following:

νd=(Nd−1)/(NF−NC)
θgd=(Ng−Nd)/(NF−NC)
θgF=(Ng−NF)/(NF−NC)

where refractive indices of the g-line, the F-line, the d-line and the C-line of the Fraunhofer lines are Ng, NF, Nd and NC, and definitions of the Abbe number νd and the partial dispersion ratios θgd and θgF are the same as that applied in general.

The optical system of the exemplary embodiment includes the refractive optical element GNL which includes the solid-state material, a positive lens component including at least one positive lens, and a negative lens component including at least one negative lens, and at least one of the following conditions can be met:

$$-2.100 \times 10^{-3} \cdot \nu d(GNL) + 0.693 < \theta gF(GNL) \quad (1)$$

$$0.555 < \theta gF(GNL) < 0.9 \quad (2)$$

$$0.03 < \psi(GNL)/\psi < 7.5 \quad (3)$$

$$0.55 < \theta gF(N) < 0.635 \quad (4)$$

$$\nu d(P) < 75 \quad (5)$$

$$\nu d(GNL) < 60 \quad (6)$$

$$-2.407 \times 10^{-3} \cdot \nu d(GNL) + 1.420 < \theta gd(GNL) \quad (7)$$

$$1.255 < \theta gd(GNL) < 1.67 \quad (8)$$

where a partial dispersion ratio of the material of the refractive optical element GNL is θgF(GNL) and θgd (GNL), an Abbe number of the material of the refractive optical element GNL is νd(GNL), a refractive power of the refractive optical element GNL according to a designated wavelength (d-line) when assuming that a light incident surface and a light irradiation surface of the refractive optical element GNL are exposed to the air is ψ(GNL), a mean partial dispersion ratio of the material of the negative lens component is θgF(N), a mean Abbe number of the material of the positive lens component is νd(P), and a refractive power of the entire system according to the designated wavelength is ψ.

Next, the technical meaning of Conditional Expressions (1) to (8) will be explained.

Conditional Expressions (1) and (2) are related to numerical ranges that can be met by the partial dispersion ratio (θgF) of the refractive optical element GNL.

Since the refractive optical element GNL is used in combination with a typical optical material, the partial dispersion ratio of the material used for the refraction optical element GNL is required to be different, but not to be so far from that value of the typical optical material. Use of the material with the partial dispersion ratio thereof being far different from that of the typical optical material causes the curvature of the wavelength characteristic curve of the chromatic aberration coefficient of the lens surface to be enlarged on the short wavelength side. In order to cancel the large curvature, the refractive power of other lenses are necessary to be enhanced, thereby increasing the aberrations such as the spherical aberration, the coma and the astigmatism, which are difficult to be reliably corrected and/or reduced.

That is, it can be useful that the material of the refractive optical element GNL employs an optical material, which can have a large, but not-too-large partial dispersion ratio compared to the typical optical material.

Accordingly, in at least one exemplary embodiment the value of the dispersion ratio will not deviate from the numerical range of Conditional Expressions (1) and (2) because then the chromatic aberration is difficult to reduce.

When the numerical range of Conditional Expression (1) is set to the following range, further useful optical performance can be obtained.

To be more specific, the range can be as follows:

$$-2.100 \times 10^{-3} \cdot vd(GNL) + 0.693 < \theta gF(GNL) < -1.231 \times 10^{-3} \cdot vd(GNL) + 0.900 \quad (1a)$$

Another useful range can be as follows:

$$-2.100 \times 10^{-3} \cdot vd(GNL) + 0.693 < \theta gF(GNL) < -1.389 \times 10^{-3} \cdot vd(GNL) + 0.823 \quad (1b)$$

Yet another range can be as follows:

$$-1.682 \times 10^{-3} \cdot vd(GNL) + 0.700 < \theta gF(GNL) < -1.682 \times 10^{-3} \cdot vd(GNL) + 0.756 \quad (1c)$$

When the numerical range of Conditional Expression (2) is set to the following range, further useful optical performances can be obtained.

To be more specific, in at least one exemplary embodiment the range is as follows:

$$0.555 < \theta gF(GNL) < 0.86 \quad (2a)$$

Another range is as follows:

$$0.555 < \theta gF(GNL) < 0.80 \quad (2b)$$

Conditional Expression (3) relates to the refractive power that can be met by the refractive optical element GNL, in order to optimize curvature of the wavelength characteristic of the chromatic aberration coefficient to reliably correct and/or reduce the chromatic aberration on the short wavelength side.

If the refractive power of the refractive optical element GNL is above the upper limit of Conditional Expression (3), curvature of the wavelength characteristic curve of the chromatic aberration coefficient is not canceled according to the refractive power of the entire system, thereby resulting in overcorrection.

On the other hand, when the refractive power of the refractive optical element GNL is below the lower limit of Conditional Expression (3), the chromatic aberration is not corrected or reduced sufficiently.

When the numerical range of Conditional Expression (3) is set to the following range, further useful optical performances can be obtained.

To be more specific, according to at least one exemplary embodiment the range is as follows:

$$0.1 < \psi(GNL)/\psi < 5 \quad (3a)$$

A further range in accordance to at least one exemplary embodiment is as follows:

$$0.2 < \psi(GNL)/\psi < 3.5 \quad (3b)$$

Conditional Expression (4) relates to the mean value of the partial dispersion ratio ($\theta gF$) of the material of the negative lens disposed on the enlargement side relative to the point P. Premised on that Conditional Expression (3) is met, Conditional Expression (4) cancels the curvature of the wavelength characteristic curve of the chromatic aberration coefficient of the refractive optical element GNL in a well balanced manner in order to reliably correct and/or reduce the chromatic aberration mainly on the short wavelength side.

If the mean value of the partial dispersion ratio of the material of the negative lens is above the upper limit of Conditional Expression (4), the refractive optical element GNL cannot cancel curvature of the wavelength characteristic curve of the chromatic aberration coefficient, thereby resulting in insufficient correction or reduction.

On the other hand, if the mean value of the partial dispersion ratio of the material of the negative lens is below the lower limit of Conditional Expression (4), the refractive optical element GNL overcorrects the curvature.

When the numerical range of Conditional Expression (4) is set to the following range, further useful optical performances can be obtained.

To be more specific, in accordance with at least one exemplary embodiment the range is as follows:

$$0.56 < \theta gF(N) < 0.625 \quad (4a)$$

When the numerical range of Conditional Expression (4) is set to the following range, further useful optical performances can be obtained.

To be more specific, a further useful range can be as follows:

$$0.57 < \theta gF(N) < 0.615 \quad (4b)$$

Conditional Expression (5) relates to the mean value of the Abbe number of the material of the positive lens disposed on the enlargement side relative to the point P.

Premised on that Conditional Expression (4) is met, Conditional Expression (5) allows the entire gradient of the wavelength characteristic curve of the chromatic aberration coefficient of the refractive optical element GNL to be canceled according to that of the negative lens in a well balanced manner to reliably correct the chromatic aberration of the entire system.

If the mean value is above the upper limit or below the lower limit of Conditional Expression (5), the entire gradient of the wavelength characteristic curve of chromatic aberration coefficient cannot be mainly canceled according to the refractive optical element GNL or the negative lens, thereby increasing the chromatic aberration.

When the numerical range of Conditional Expression (5) is set to the following range, further useful optical performances can be obtained.

To be more specific, in accordance with at least one exemplary embodiment the range is as follows:

$$vd(P) < 70 \quad (5a)$$

A further range to obtain further useful optical performances is as follows:

$$vd(P) < 65 \quad (5b)$$

In addition, if the absolute value of the Abbe number vd(GNL) of the material of the refractive optical element GNL is small, i.e., if the material has the high dispersion, the chromatic aberration can be reduced independently.

This will be described below with reference to the longitudinal chromatic aberration coefficient and the lateral chromatic aberration coefficient of the lens surface.

When the power variation of the surface of the refractive lens is $\Delta \psi$ and the Abbe number is $v$, a variation $\Delta L$ of the longitudinal chromatic aberration coefficient and a variation ΔT of the lateral chromatic aberration coefficient of the lens surface can be expressed as follows:

$$\Delta L \propto \Delta \psi / \nu$$

$$\Delta T \propto \Delta \psi / \nu$$

As defined by the above expressions, the variations ΔL and ΔT of the respective aberration coefficients relative to the power variation of the lens surface increases as the absolute value of the Abbe number ν decreases (i.e., the dispersion is large). Therefore, the power variation for obtaining necessary chromatic aberration can be small as far as the high dispersion material with the small absolute number of the Abbe number ν is used.

This means in aberration theory that the chromatic aberration can be controlled without significantly influencing the spherical aberration, the coma, the astigmatism and other related or equivalent apparatus and/or methods as known by one of ordinary skill in the relevant art, thereby enhancing the independency of the correction of the chromatic aberration. In contrast, when the low dispersion material is used, the power variation for obtaining the necessary chromatic aberration increases and then the aberrations such as the spherical aberration largely vary, thereby degrading the independency of the correction of the chromatic aberration.

Hence, in view of correcting and/or reducing the aberration, it can be useful that at least one of the lens surfaces of the lenses forming the optical system be a refractive lens surface which includes the high dispersion material.

Conditional Expression (6), with regard to the above-described reasons, specifies the numerical range of the Abbe number vd(GNL) of the material of the refractive optical element GNL. If the numerical range indicated by Conditional Expression (6) is set, the effect of independently correcting and/or reducing the chromatic aberration is enhanced, thereby obtaining useful optical performances.

The numerical value of Conditional Expression (6) in accordance with at least one exemplary embodiment can be set to the following range:

$$\nu d(GNL) < 45 \quad (6a)$$

A further range is as follows:

$$\nu d(GNL) < 30 \quad (6b)$$

Conditional Expressions (7) and (8) specify the partial dispersion ratio θgd of the refractive optical element GNL. When Conditional Expressions (7) and (8) are expressions for reliably correcting and/or reducing the chromatic aberration over the entire wavelength band. If Conditional Expressions (7) and (8) are not met, the chromatic aberration can be difficult to reduce.

When the numerical range of Conditional Expression (7) is set to the following range, further useful optical performances can be obtained.

To be more specific, in accordance with at least one exemplary embodiment the range is as follows:

$$-2.407 \times 10^{-3} \cdot \nu d(GNL) + 1.420 < \theta gd(GNL) < -1.152 \times 10^{-3} \cdot \nu d(GNL) + 1.651 \quad (7a)$$

A further range is as follows:

$$-2.407 \times 10^{-3} \cdot \nu d(GNL) + 1.420 < \theta gd(GNL) < -1.865 \times 10^{-3} \cdot \nu d(GNL) + 1.572 \quad (7b)$$

Yet, a further range is as follows:

$$-2.076 \times 10^{-3} \cdot \nu d(GNL) + 1.426 < \theta gd(GNL) < -2.076 \times 10^{-3} \cdot \nu d(GNL) + 1.512 \quad (7c)$$

When the numerical range of Conditional Expression (8) is set to the following range, further useful optical performances can be obtained.

To be more specific, in accordance with at least one exemplary embodiment the range is as follows:

$$1.255 < \theta gd(GNL) < 1.61 \quad (8a)$$

A further range is as follows:

$$1.255 < \theta gd(GNL) < 1.54 \quad (8b)$$

Next, specific examples of the material (solid-state material) for the refractive optical element GNL will be described below.

A specific example of the material of the refractive optical element GNL can be a resin.

Among various resins, a UV-curing resin (nd=1.635, νd=22.7, θgF=0.69) or a N-polyvinylcarbazole (nd=1.696, νd=17.7, θgF=0.69) can be the material which can meet the above-described Conditional Expressions (1) and (2), however, the material of the refractive optical element is not limited thereto.

Alternatively, the material, which can have a characteristic different from the typical glass member, can be a mixture in which the below-described inorganic oxide particle is dispersed into a synthetic resin.

To be more specific, the inorganic oxide particle can be $TiO_2$ (nd=2.304, νd=13.8), $Nb_2O_5$ (nd=2.367, νd=14.0), ITO (nd=1.8581, νd=5.53), $Cr_2O_3$ (nd=2.2178, νd=13.4), $BaTiO_3$ (nd=2.4362, νd=11.3) or other related or equivalent particles as known by one of ordinary skill in the relevant art.

Among these, when the $TiO_2$ (nd=2.304, νd=13.8, θgF=0.87) particle is dispersed into the synthetic resin, it becomes the solid-state material meeting the above-described Conditional Expressions (1) and (2).

$TiO_2$ can be the material used in various purposes, and in the optical field, the $TiO_2$ is used as a deposition material for performing an optical thin coating such as an antireflection coating.

In addition, the $TiO_2$ particle is used as a photocatalyst, a white pigment, or a cosmetic material.

However, the well-known usage of the $TiO_2$ does not include an example of being used as an optical member for correcting and/or reducing chromatic aberration of the optical system in a form of a mixture with the particle.

The mean diameter of the $TiO_2$ particle is can be about 2 to 50 nm in view of scattering, and a dispersant or other related or equivalent apparatus and/or methods as known by one of ordinary skill in the relevant art can be added for restraining cohesion.

As a medium material in which the $TiO_2$ is dispersed, a polymer is appropriate, which effectively delivers mass productivity by molding with photo polymerization or with thermal polymerization by using a molding die or other related or equivalent apparatus and/or methods as known by one of ordinary skill in the relevant art.

In addition, in view of the characteristic of the optical constant of the polymer, a polymer, which can have an equivalently high partial dispersion ratio, a polymer, which can have an equivalently small Abbe number, or a polymer-having both can be applicable. For example, a N-polyvinylcarbazole, a styrene or a polymethyl methacrylate (acryl) is applicable.

In the later-described examples, the UV-curing resin and the N-polyvinylcarbazole are used as a host polymer in which the $TiO_2$ particle is dispersed, however, it is not limited thereto.

The dispersion characteristic N(λ) of a mixture in with a nano-particle is dispersed can be calculated easily according to the following expression derived by well-known Drude's equation as follows:

$$N(\lambda)=[1+V\{N_{Tio}^2(\lambda)-1\}+(1-V)\{N_p^2(\lambda)-1\}]^{1/2}$$

where λ is an arbitrary wavelength, $N_{Tio}$ is a refractive index of the $TiO_2$, $N_p$ is a refractive index of the polymer, V is a fraction of the entire volume of the $TiO_2$ particle relative to the volume of the polymer.

When the absolute value of the refractive index of the d-line according to the temperature variation between 0 and 40° C. is |dn/dT|, the solid-state material used in at least one exemplary embodiment can meet the following condition:

$$|dn/dT|<2.5\times10^{-4} \qquad (9)$$

If the solid-state material is deviated from the range of Conditional Expression (9), in some configurations the optical performance cannot be maintained with the temperature range between 0 and 40° C.

In the below-described examples, the solid-state material can be applied to a lens in the optical system or to a layer provided on a lens surface.

Then, if a refractive surface of the refractive optical element GNL is aspherical, chromatic aberration flare such as the spherical aberration with color can be reduced.

In addition, if a boundary is formed between the refractive optical element GNL and an atmosphere like air or a material, which can have a equivalently low refractive index, the chromatic aberration can be varied equivalently largely according to a slight variation of the curvature of the boundary.

Then, if a plurality of the refractive optical elements GNL are applied to a plurality of the lenses or to a plurality of the layers on the lens surfaces in the optical system, the power of each refractive index can be reduced, thereby being effective for collecting the aberration.

Next, examples in which the refractive optical element can be applied to the specific optical system will be described.

Here, non-limiting examples of what can be used for the refractive optical element GNL are a UV-curing resin 1, the N-polyvinylcarbazole, and a $TiO_2$ particle dispersion material in which the $TiO_2$ is dispersed into the UV-curing resin 1, a UV-curing resin 2 or the N-polyvinylcarbazole as the host polymer. Note that two types of the UV-curing resin (UV-curing resin 1 and UV-curing resin 2) are employed to allow the $TiO_2$ particle to be dispersed therein.

FIG. 1 is a cross section of the optical system according to Numerical Example 1, which is an example of applying a refractive optical element which includes the UV-curing resin 1 to a super-telephoto lens with focal length of 300 mm.

In FIG. 1, a left side is an object side (front side) whereas a right side is an image side (rear side), which are the same as in other Numerical Examples.

In FIG. 1, GNL1a denotes the lens (layer) (refractive optical element) which includes the UV-curing resin 1, and SP denotes an aperture stop.

IP denotes an image plane, which corresponds to an imaging plane in a case of a solid-state image pickup device (photoelectric converter) such as a CCD (Charged Coupled Device) sensor or a CMOS (Complementary Metal-Oxide Semiconductor) sensor when being used for a photographic optical system like a video camera or a digital still camera, or corresponds to a film plane in a case of a silver salt film camera or other image pickup device as known by one of ordinary skill in the relevant arts and equivalents).

In the optical system according to Numerical Example 1, the refractive optical element GNL1a which includes the UV-curing resin 1 is employed on the object side relative to the aperture stop SP such that a paraxial marginal ray passes through a position equivalently higher than the optical axis.

Then, a positive refractive power can be applied to the lens (layer) GNL1a, which includes the UV-curing resin 1, to correct and/or reduce the chromatic aberration, thereby providing a compact, super-telephoto lens.

Figure 2:
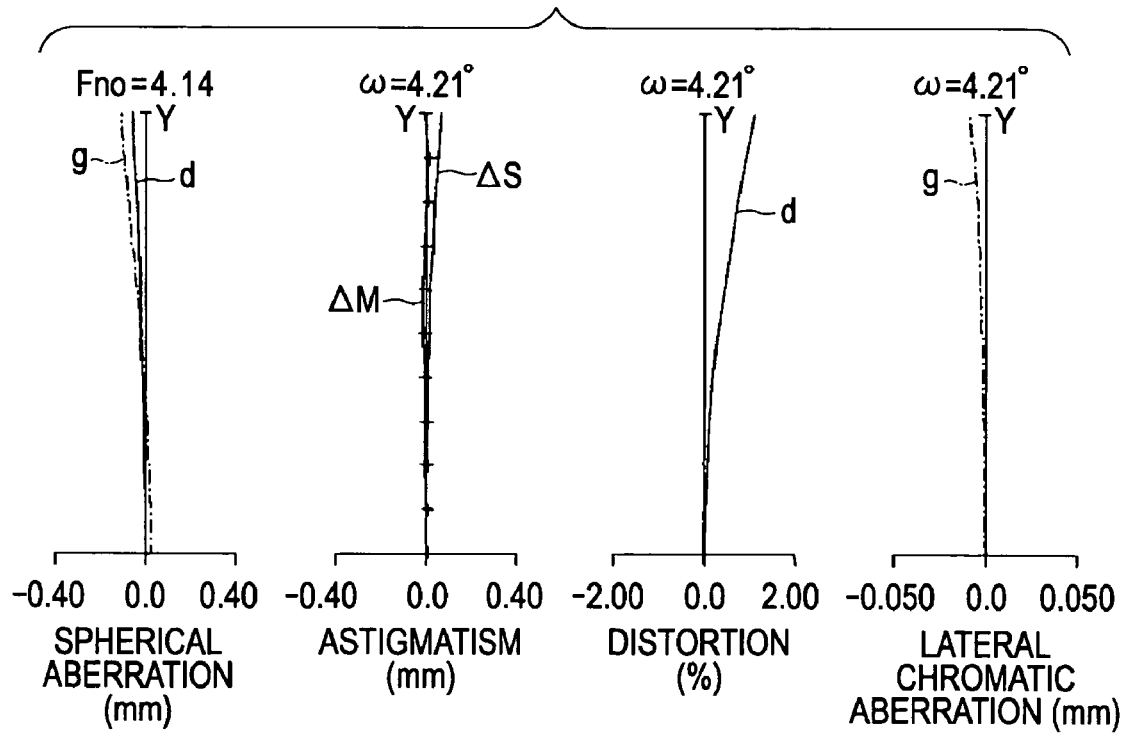
FIG. 2 is an aberration diagram according to Numerical Example 1 in accordance with at least one exemplary embodiment.

FIG. 2 is an aberration diagram of an optical system while an object at infinity is in focus according to Numerical Example 1.

In the aberration diagram, d and g denote the d-line and the g-line, respectively, ΔM and ΔS denote a meridional image plane of the d-line and a sagittal image plane of the d-line, respectively, the lateral chromatic aberration being indicated according to the g-line, Fno denotes the F-number, and ω denotes a half field angle.

These reference characters are the same as in other aberration diagrams.

Figure 3:
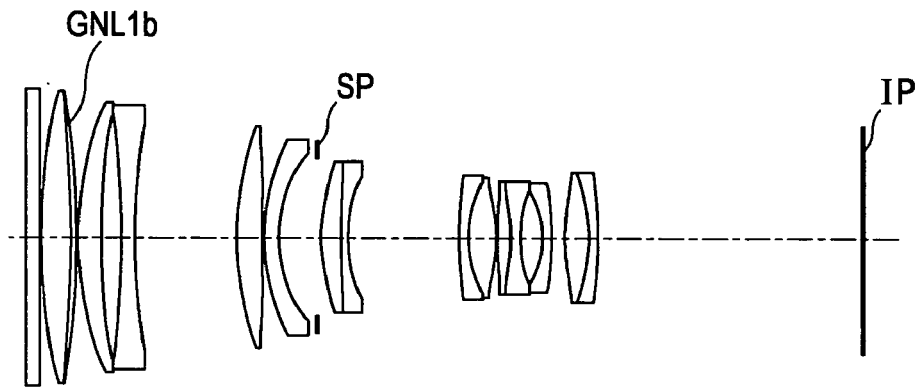
FIG. 3 is a cross section of an optical system according to Numerical Example 2 in accordance with at least one exemplary embodiment.
Figure 4:
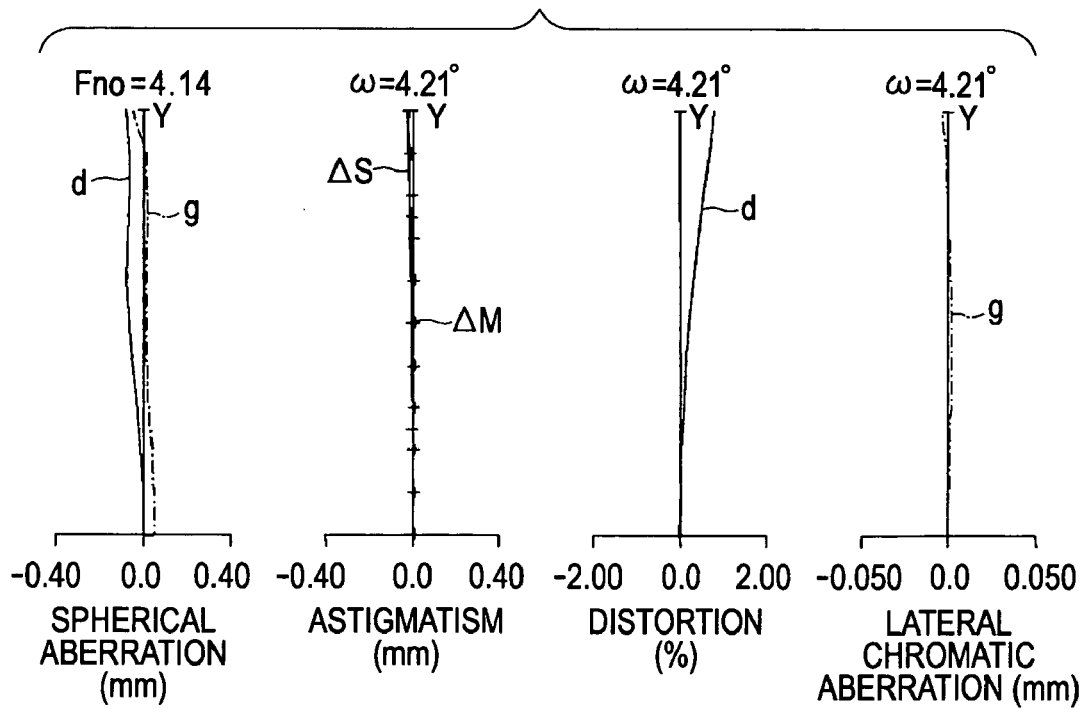
FIG. 4 is an aberration diagram according to Numerical Example 2 in accordance with at least one exemplary embodiment.

FIG. 3 is a cross section of an optical system according to Numerical Example 2. This is an example of applying a refractive optical element which includes the mixture, in which the $TiO_2$ particle is dispersed into the UV-curing resin 1 by 20% in volume, to a super-telephoto lens with 300 mm of focal length. In FIG. 3, GNL1b denotes a lens (layer) (refractive optical element) which includes the $TiO_2$ particle dispersion material. FIG. 4 is an aberration diagram of an optical system while an object at infinity is in focus according to Numerical Example 2.

In the optical system according to Numerical Example 2, the refractive optical element GNL1b which includes the $TiO_2$ particle dispersion material is employed on the object side relative to the aperture stop SP such that a paraxial marginal ray passes through a position equivalently higher than the optical axis. Then, a positive refractive power can be applied to the lens (layer) GNL1b, which includes the $TiO_2$ particle dispersion material, to correct and/or reduce the chromatic aberration, thereby providing a compact, super-telephoto lens.

Figure 5:
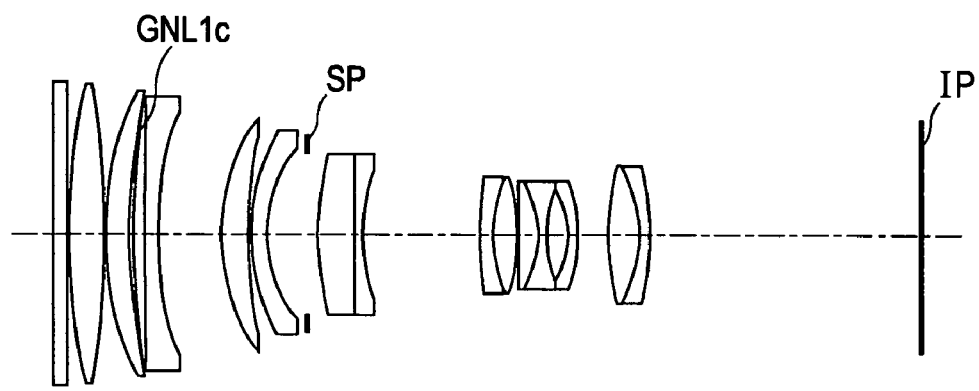
FIG. 5 is a cross section of an optical system according to Numerical Example 3 in accordance with at least one exemplary embodiment.

FIG. 5 is a cross section of an optical system according to Numerical Example 3. This is an example of applying a refractive optical element which includes the mixture, in which the $TiO_2$ particle is dispersed into the UV-curing resin 2 by 20% in volume, to a super-telephoto lens with 300 mm of focal length.

Figure 6:
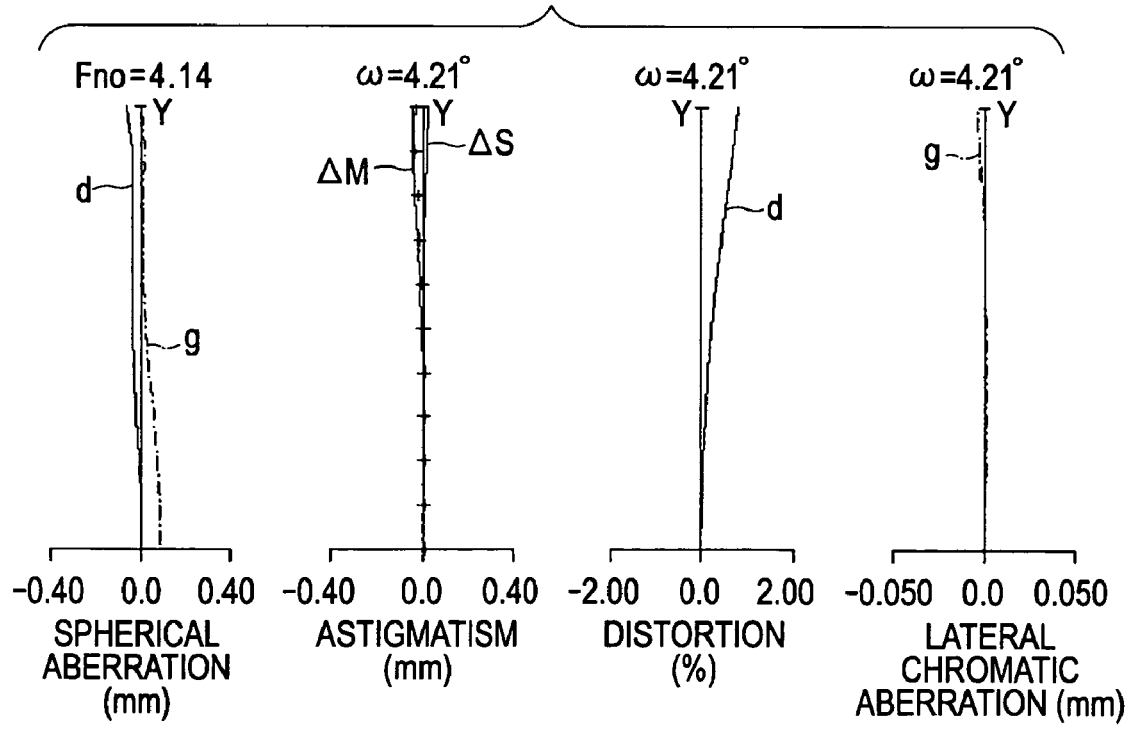
FIG. 6 is an aberration diagram according to Numerical Example 3 in accordance with at least one exemplary embodiment.

In FIG. 5, GNL1c denotes a lens (layer) (refractive optical element) which includes the $TiO_2$ particle dispersion material. FIG. 6 is an aberration diagram of an optical system while an object at infinity is in focus according to Numerical Example 3.

In the optical system according to Numerical Example 3, the refractive optical element GNL1c which includes the $TiO_2$ particle dispersion material is employed on the object side relative to the aperture stop SP such that a paraxial marginal ray passes through a position equivalently higher than the optical axis.

Then, a positive refractive power can be applied to the lens (layer) GNL1c which includes the $TiO_2$ particle dispersion material to correct and/or reduce the chromatic aberration, thereby providing a compact, super-telephoto lens.

Figure 7:
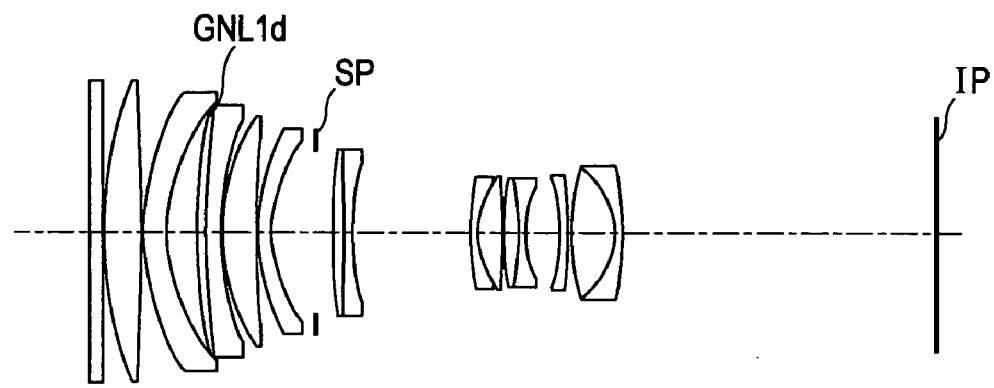
FIG. 7 is a cross section of an optical system according to Numerical Example 4 in accordance with at least one exemplary embodiment.

FIG. 7 is a cross section of an optical system according to Numerical Example 4. This is an example of applying a refractive optical element which includes the mixture, in which the TiO₂ particle is dispersed into the UV-curing resin 2 by 3% in volume, to a super-telephoto lens with 300 mm of focal length.

In FIG. 7, GNL1d denotes a lens (layer) (refractive optical element) which includes the TiO₂ particle dispersion material.

Figure 8:
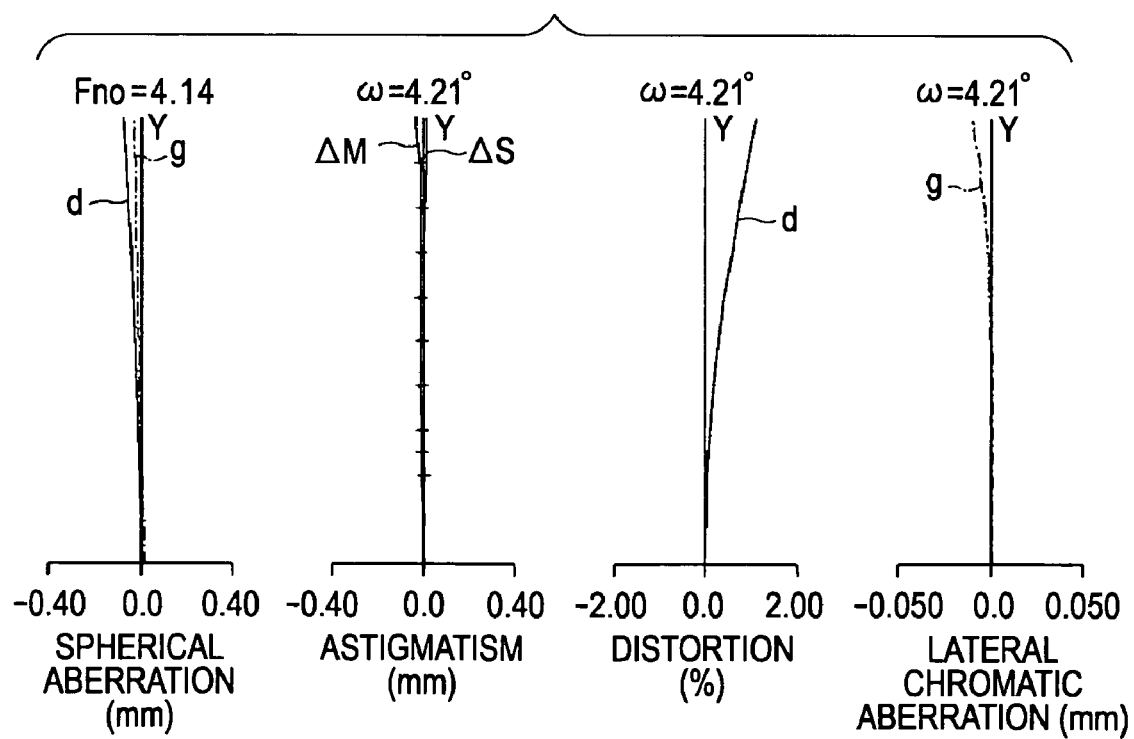
FIG. 8 is an aberration diagram according to Numerical Example 4 in accordance with at least one exemplary embodiment.

FIG. 8 is an aberration diagram of an optical system while an object at infinity is in focus according to Numerical Example 4.

In the optical system according to Numerical Example 4, the refractive optical element GNL1d which includes the TiO₂ particle dispersion material is employed on the object side relative to the aperture stop SP such that a paraxial marginal ray passes through a position equivalently higher than the optical axis. Then, a positive refractive power can be applied to the lens (layer) GNL1d, which includes the TiO₂ particle dispersion material, to correct and/or reduce the chromatic aberration, thereby providing a compact, super-telephoto lens.

Figure 9:
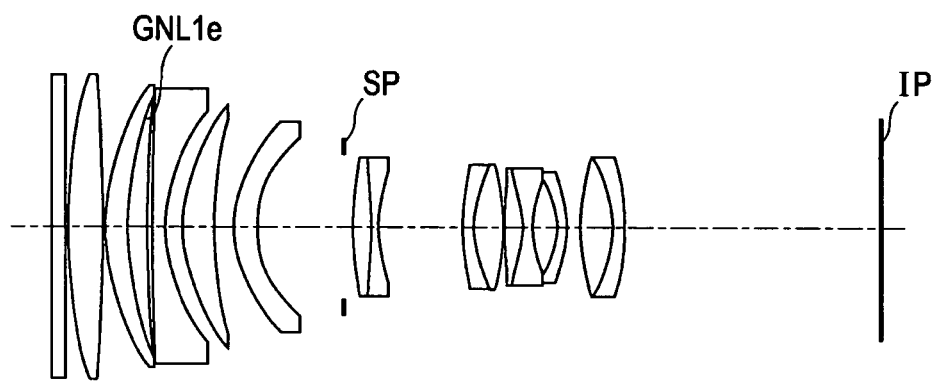
FIG. 9 is a cross section of an optical system according to Numerical Example 5 in accordance with at least one exemplary embodiment.

FIG. 9 is a cross section of an optical system according to Numerical Example 5. This is an example of applying a refractive optical element which includes the N-polyvinylcarbazole to a super-telephoto lens with 300 mm of focal length. In FIG. 9, GNL1e denotes a lens (layer) (refractive optical element) which includes the N-polyvinylcarbazole.

Figure 10:
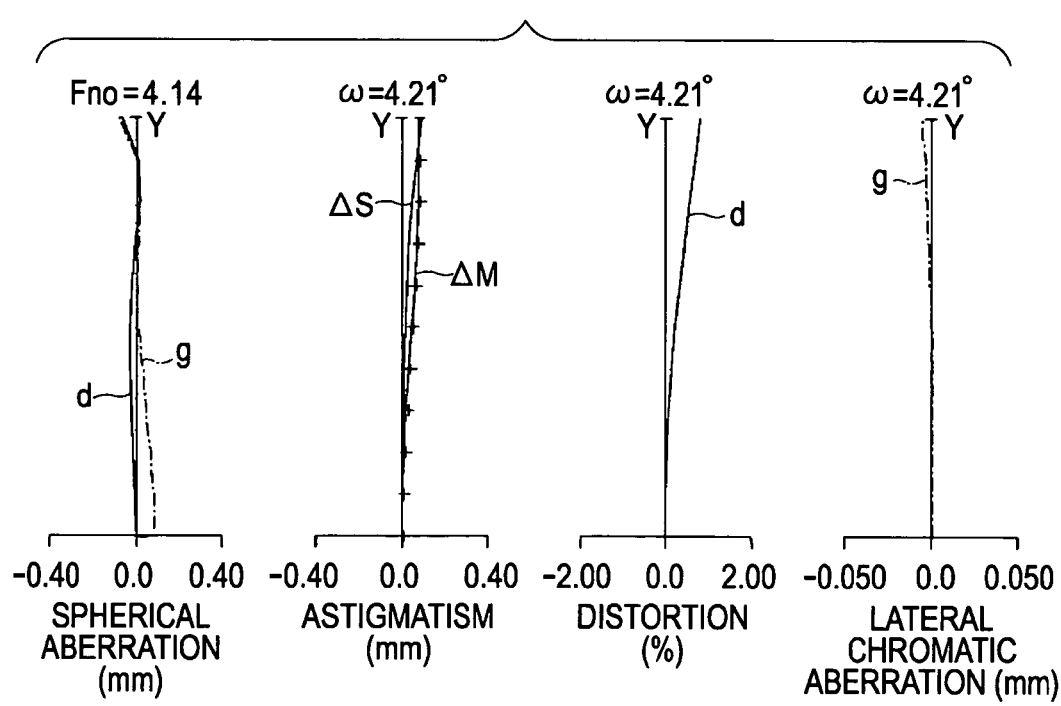
FIG. 10 is an aberration diagram according to Numerical Example 5 in accordance with at least one exemplary embodiment.

FIG. 10 is an aberration diagram of an optical system while an object at infinity is in focus according to Numerical Example 5.

In the optical system according to Numerical Example 5, the refractive optical element which includes the N-polyvinylcarbazole is employed on the object side relative to the aperture stop SP such that a paraxial marginal ray passes through a position equivalently higher than the optical axis. Then, a positive refractive power can be applied to the lens (layer) GNL1e, which includes the N-polyvinylcarbazole, to correct and/or reduce the chromatic aberration, thereby providing a compact, super-telephoto lens.

Figure 11:
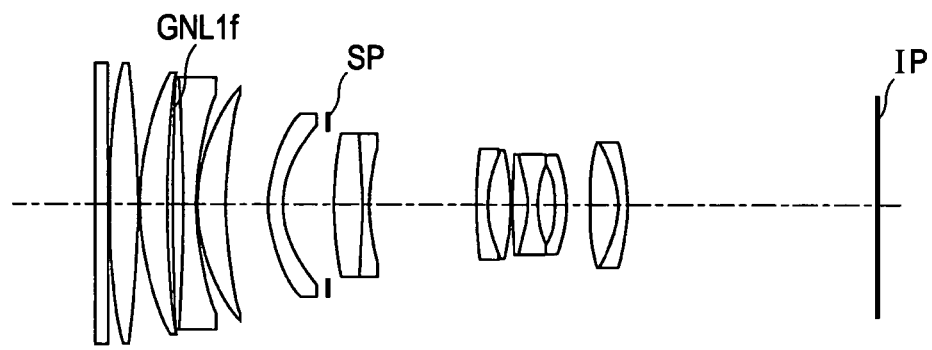
FIG. 11 is a cross section of an optical system according to Numerical Example 6 in accordance with at least one exemplary embodiment.

FIG. 11 is a cross section of an optical system according to Numerical Example 6. This is an example of applying a refractive optical element which includes the mixture, in which the TiO₂ particle is dispersed into the N-polyvinylcarbazole by 20% in volume, to a super-telephoto lens with 300 mm of focal length.

In FIG. 11, GNL1f denotes a lens (layer) (refractive optical element) which includes the TiO₂ particle dispersion material.

Figure 12:
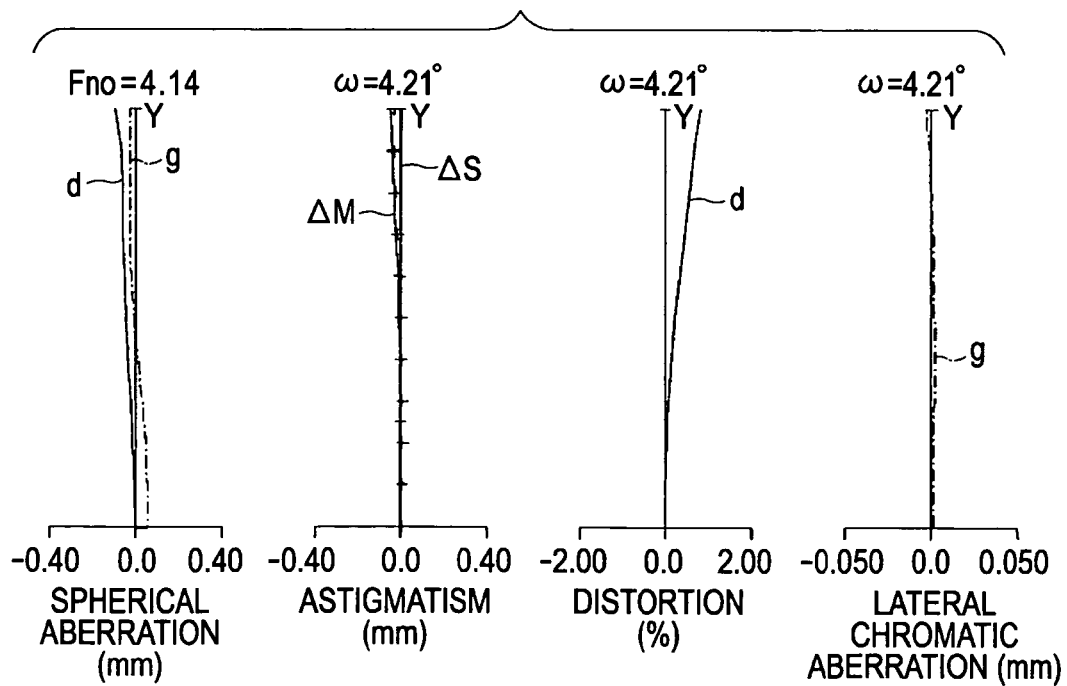
FIG. 12 is an aberration diagram according to Numerical Example 6 in accordance with at least one exemplary embodiment.

FIG. 12 is an aberration diagram of an optical system while an object at infinity is in focus according to Numerical Example 6.

In the optical system according to Numerical Example 6, the refractive optical element GNL1f which includes the TiO₂ particle dispersion material is employed on the object side relative to the aperture stop SP such that a paraxial marginal ray passes through a position equivalently higher than the optical axis.

Then, a positive refractive power can be applied to the lens (layer) GNL1f, which includes the TiO₂ particle dispersion material, to correct and/or reduce the chromatic aberration, thereby providing a compact, super-telephoto lens.

Figure 13:
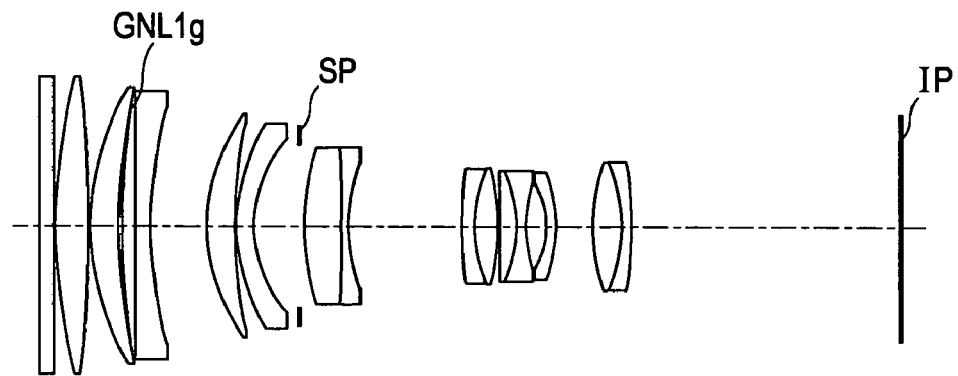
FIG. 13 is a cross section of an optical system according to Numerical Example 7 in accordance with at least one exemplary embodiment.

FIG. 13 is a cross section of an optical system according to Numerical Example 7. This is an example of applying a refractive optical element which includes the TiO₂ to a super-telephoto lens with 300 mm of focal length. In FIG. 13, GNL1g denotes a lens (layer) (refractive optical element) which includes the TiO₂.

Figure 14:
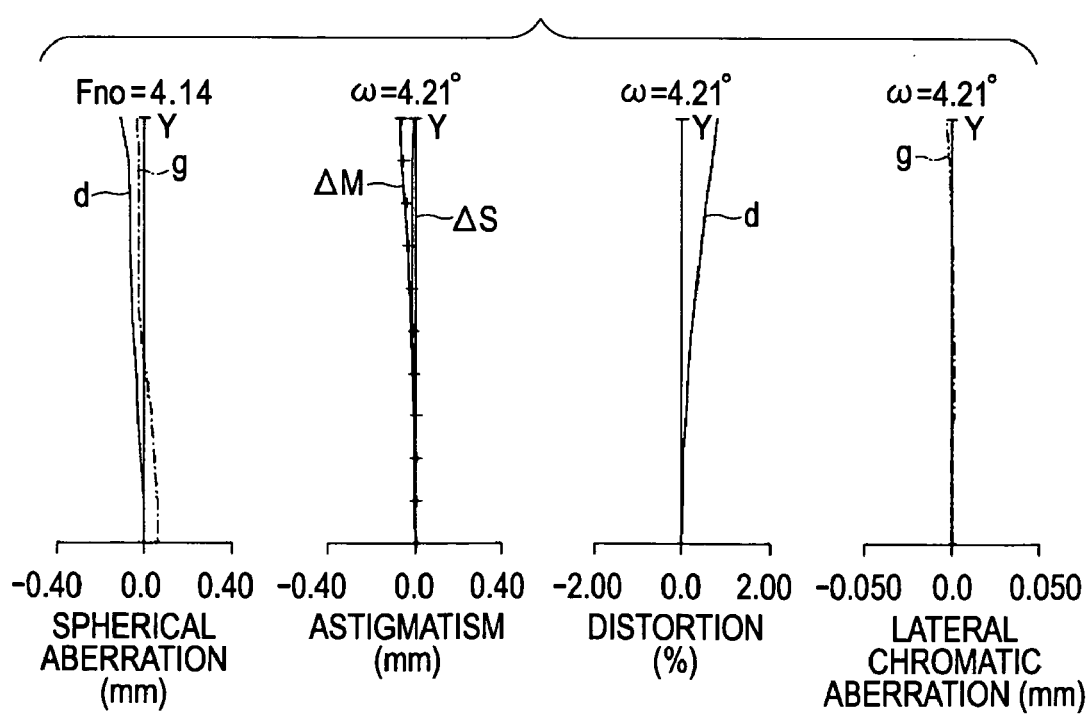
FIG. 14 is an aberration diagram according to Numerical Example 7 in accordance with at least one exemplary embodiment.

FIG. 14 is an aberration diagram of an optical system while an object at infinity is in focus according to Numerical Example 7.

In the optical system according to Numerical Example 7, the refractive optical element which includes the TiO₂ is employed on the object side relative to the aperture stop SP such that a paraxial marginal ray passes through a position equivalently higher than the optical axis.

Then, a positive refractive power can be applied to the lens (layer) GNL1g, which includes the TiO₂, to correct and/or reduce the chromatic aberration, thereby providing a compact, super-telephoto lens.

According to the above-described examples, not the aberrations such as the chromatic aberration can be reliably corrected and/or reduced, but also the optical system can be easily manufactured and excellent environment resistance can be obtained.

Next, specific numerical data of Numerical Examples 1 to 7 will be shown below.

In numeric examples, i denotes an order counted from the object side, Ri denotes an ith radius of curvature of an optical surface (ith surface), Di denotes an axial interval between the ith surface and an (i+1)th surface, and Ni and vi denote an ith refractive index and an ith Abbe number of the material of the optical member (excluding the lens (layer) (refractive optical element) which includes the resin or the TiO₂ particle dispersion material) relative to the d-line, respectively. A refractive index and an Abbe number of the refractive optical element GNL1 which includes the resin or the TiO₂ particle dispersion material relative to the d-line are denoted separately by NGNL1 and VGNL1, respectively. In addition, f denotes a focal length, Fno denotes a F-number, and ω denotes a half field angle.

Incidentally, an aspherical profile is expressed as follows:

$$x(h) = \frac{(1/r)h^2}{1+\sqrt{\{1-(1+k)(h/r)^2\}}} + Bh^4 + Ch^6 + 1)h^8 + Eh^{10}$$

where X is an amount of displacement from the vertex of a lens surface in an optical axis direction, h is a height from the optical axis in a direction orthogonal to the optical axis, r is a paraxial radius of curvature, k is a conic constant, and B, C, D, E and so on are aspherical coefficients of corresponding orders, respectively.

Note that "E±XX" shown in each aspherical coefficient indicates "×10$^{\pm XX}$".

Table 1 illustrates the refractive indices, the Abbe numbers, the partial dispersion ratios of the UV-curing resin 1, the UV-curing resin 2, the N-polyvinylcarbazole, and the TiO₂, respectively, according to the d-line, the g-line, the C-line and the F-line.

Table 2 illustrates the refractive indices, the Abbe numbers, the partial dispersion ratios of: the UV-curing resin 1; the mixture in which the TiO₂ particle is mixed into the UV-curing resin 1 by 20% in volume; the mixture in which the TiO₂ particle is mixed into the UV-curing resin 2 by 20% in volume; the mixture in which the TiO₂ particle is mixed into the UV-curing resin 2 by 3% in volume; the N-polyvinylcarbazole; the mixture in which the TiO₂ particle is mixed into the N-polyvinylcarbazole by 20% in volume; and the TiO₂, respectively, according to the d-line, the g-line, the C-line and the F-line. In Table 2, the numeric values of the mixtures are derived by Drude's equation described above.

In addition, Table 3 shows numeric values corresponding to the above-described Conditional Expressions of Numerical Examples. In Table 3, the values of θgF(N) and vd(P) are calculated based on the negative lens and the positive lens (other than GNL) disposed on the object side relative to the aperture stop SP.

Numerical Example 1 f = 294    Fno = 4.14    2ω = 8.42°

| | | | |
|---|---|---|---|
| R1 = ∞ | D1 = 3.30 | N1 = 1.58600 | ν1 = 58.6 |
| R2 = ∞ | D2 = 0.15 | | |
| R3 = 150.401 | D3 = 8.04 | N2 = 1.60311 | ν2 = 60.6 |
| R4 = −313.692 | D4 = 0.15 | | |
| R5 = 66.327 | D5 = 8.15 | N3 = 1.60311 | ν3 = 60.6 |
| R6 = 201.453 | D6 = 4.22 | NGNL 1 = 1.63555 | vGNL 1 = 22.7 |
| *R7 = −356.398 (Aspherical) | D7 = 0.33 | | |
| R8 = −330.180 | D8 = 3.40 | N4 = 1.84666 | ν4 = 23.8 |
| R9 = 95.662 | D9 = 0.15 | | |
| R10 = 48.361 | D10 = 7.95 | N5 = 1.48749 | ν5 = 70.2 |
| R11 = 122.204 | D11 = 4.88 | | |
| R12 = 48.049 | D12 = 3.00 | N6 = 1.77250 | ν6 = 49.6 |
| R13 = 33.156 | D13 = 11.77 | | |
| R14 = ∞ (Aperture Stop) | D14 = 4.00 | | |
| R15 = 217.377 | D15 = 2.69 | N7 = 1.84666 | ν7 = 23.8 |
| R16 = −291.113 | D16 = 2.00 | N8 = 1.88300 | ν8 = 40.8 |
| R17 = 81.708 | D17 = 31.54 | | |
| R18 = 51.063 | D18 = 1.60 | N9 = 1.84666 | ν9 = 23.8 |
| R19 = 21.417 | D19 = 6.71 | N10 = 1.59551 | ν10 = 39.2 |
| R20 = −114.152 | D20 = 0.15 | | |
| R21 = 97.843 | D21 = 3.58 | N11 = 1.84666 | ν11 = 23.8 |
| R22 = −57.175 | D22 = 1.50 | N12 = 1.77250 | ν12 = 49.6 |
| R23 = 25.819 | D23 = 8.42 | | |
| R24 = −34.289 | D24 = 1.50 | N13 = 1.77250 | ν13 = 49.6 |
| R25 = −117.034 | D25 = 0.44 | | |
| R26 = 56.461 | D26 = 11.42 | N14 = 1.51633 | ν14 = 64.1 |
| R27 = −17.994 | D27 = 1.80 | N15 = 1.48749 | ν15 = 70.2 |
| R28 = −70.708 | | | |

(Aspherical Coefficient)

| | (Conic Constant)(k) k | (4th Coefficient)(B) B | (6th Coefficient)(C) C | (8th Coefficient)(D) D | (10th Coefficient)(E) E |
|---|---|---|---|---|---|
| 7th Surface | −1.440392E+01 | 4.995320E−09 | −1.821980E−11 | 3.159500E−15 | −2.187060E−19 |

Numerical Example 2 f = 294    Fno = 4.14    2ω = 8.42°

| | | | |
|---|---|---|---|
| R1 = ∞ | D1 = 3.30 | N1 = 1.58600 | ν1 = 58.6 |
| R2 = ∞ | D2 = 0.15 | | |
| R3 = 145.785 | D3 = 7.78 | N2 = 1.66196 | ν2 = 56.7 |
| R4 = −409.049 | D4 = 1.26 | NGNL 1 = 1.78927 | vGNL 1 = 17.6 |
| R5 = −225.467 | D5 = 0.15 | | |
| R6 = 79.549 | D6 = 6.24 | N3 = 1.63119 | ν3 = 59.2 |
| R7 = 189.549 | D7 = 5.19 | | |
| R8 = −231.046 | D8 = 3.40 | N4 = 1.85000 | ν4 = 23.0 |
| R9 = 205.144 | D9 = 25.48 | | |
| R10 = 83.098 | D10 = 6.53 | N5 = 1.60363 | ν5 = 40.0 |
| R11 = −503.582 | D11 = 0.15 | | |
| R12 = 52.453 | D12 = 4.00 | N6 = 1.85000 | ν6 = 23.0 |
| R13 = 35.937 | D13 = 10.06 | | |
| R14 = ∞ (Aperture Stop) | D14 = 0.91 | | |
| R15 = 54.529 | D15 = 4.69 | N7 = 1.65301 | ν7 = 31.6 |
| R16 = 288.972 | D16 = 2.00 | N8 = 1.88500 | ν8 = 41.0 |
| R17 = 42.732 | D17 = 28.15 | | |
| R18 = 123.421 | D18 = 2.40 | N9 = 1.85000 | ν9 = 23.0 |
| R19 = 32.856 | D19 = 7.01 | N10 = 1.61831 | ν10 = 34.8 |
| R20 = −57.494 | D20 = 0.15 | | |
| R21 = 181.625 | D21 = 3.65 | N11 = 1.77638 | ν11 = 25.2 |
| R22 = −70.687 | D22 = 2.40 | N12 = 1.86287 | ν12 = 42.5 |
| R23 = 39.430 | D23 = 5.30 | | |
| R24 = −29.062 | D24 = 2.40 | N13 = 1.53724 | ν13 = 65.6 |
| R25 = −69.241 | D25 = 3.31 | | |
| R26 = 68.420 | D26 = 6.07 | N14 = 1.61596 | ν14 = 35.0 |

-continued

| Numerical Example 2 | | | |
|---|---|---|---|
| R27 = −47.670 | D27 = 2.40 | N15 = 1.88500 | ν15 = 41.0 |
| R28 = −112.533 | | | |

| Numerical Example 3 | | | |
|---|---|---|---|
| f = 294 | Fno = 4.14 | 2ω = 8.42° | |
| R1 = ∞ | D1 = 3.30 | N1 = 1.58600 | ν1 = 58.6 |
| R2 = ∞ | D2 = 0.15 | | |
| R3 = 131.852 | D3 = 8.56 | N2 = 1.71943 | ν2 = 53.0 |
| R4 = −346.555 | D4 = 0.15 | | |
| R5 = 72.296 | D5 = 6.28 | N3 = 1.60168 | ν3 = 61.3 |
| R6 = 148.006 | D6 = 1.39 | NGNL 1 = 1.70877 | νGNL 1 = 21.6 |
| R7 = 244.534 | D7 = 2.79 | | |
| R8 = −3838.833 | D8 = 3.40 | N4 = 1.86248 | ν4 = 27.4 |
| R9 = 106.486 | D9 = 14.62 | | |
| R10 = 50.572 | D10 = 6.71 | N5 = 1.54721 | ν5 = 51.1 |
| R11 = 143.866 | D11 = 0.15 | | |
| R12 = 51.210 | D12 = 4.00 | N6 = 1.85000 | ν6 = 23.0 |
| R13 = 34.493 | D13 = 10.79 | | |
| R14 = ∞ (Aperture Stop) | D14 = 1.67 | | |
| R15 = 74.863 | D15 = 9.03 | N7 = 1.64171 | ν7 = 32.5 |
| R16 = −738.691 | D16 = 2.00 | N8 = 1.88500 | ν8 = 41.0 |
| R17 = 54.049 | D17 = 29.05 | | |
| R18 = 179.692 | D18 = 2.40 | N9 = 1.85000 | ν9 = 23.0 |
| R19 = 32.167 | D19 = 6.33 | N10 = 1.56211 | ν10 = 42.8 |
| R20 = −46.491 | D20 = 0.15 | | |
| R21 = 390.958 | D21 = 4.60 | N11 = 1.85000 | ν11 = 23.0 |
| R22 = −30.396 | D22 = 2.40 | N12 = 1.81818 | ν12 = 46.0 |
| R23 = 37.035 | D23 = 4.93 | | |
| R24 = −24.978 | D24 = 2.40 | N13 = 1.78000 | ν13 = 50.0 |
| R25 = −38.861 | D25 = 7.69 | | |
| R26 = 73.090 | D26 = 7.16 | N14 = 1.64039 | ν14 = 32.7 |
| R27 = −32.869 | D27 = 2.40 | N15 = 1.85000 | ν15 = 23.0 |
| R28 = −73.397 | | | |

| Numerical Example 4 | | | |
|---|---|---|---|
| f = 294 | Fno = 4.14 | 2ω = 8.42° | |
| R1 = ∞ | D1 = 3.30 | N1 = 1.58600 | ν1 = 58.6 |
| R2 = ∞ | D2 = 0.15 | | |
| R3 = 104.309 | D3 = 8.88 | N2 = 1.61272 | ν2 = 58.7 |
| R4 = −721.610 | D4 = 0.15 | | |
| R5 = 60.746 | D5 = 6.00 | N3 = 1.84666 | ν3 = 23.8 |
| R6 = 48.097 | D6 = 7.46 | NGNL 1 = 1.55324 | νGNL 1 = 39.8 |
| *R7 = 164.031 (Aspherical) | D7 = 2.21 | | |
| R8 = 286.464 | D8 = 3.40 | N4 = 1.84666 | ν4 = 23.8 |
| R9 = 80.019 | D9 = 0.15 | | |
| R10 = 51.661 | D10 = 8.52 | N5 = 1.51823 | ν5 = 58.9 |
| R11 = 331.095 | D11 = 0.29 | | |
| R12 = 55.060 | D12 = 3.00 | N6 = 1.83481 | ν6 = 42.7 |
| R13 = 37.150 | D13 = 11.04 | | |
| R14 = ∞ (Aperture Stop) | D14 = 4.00 | | |
| R15 = 183.593 | D15 = 2.81 | N7 = 1.80518 | ν7 = 25.4 |
| R16 = −336.000 | D16 = 2.00 | N8 = 1.88300 | ν8 = 40.8 |
| R17 = 81.708 | D17 = 28.52 | | |
| R18 = 68.535 | D18 = 1.60 | N9 = 1.84666 | ν9 = 23.8 |
| R19 = 23.666 | D19 = 6.15 | N10 = 1.59551 | ν10 = 39.2 |
| R20 = −107.111 | D20 = 0.15 | | |
| R21 = 96.934 | D21 = 3.18 | N11 = 1.84666 | ν11 = 23.8 |
| R22 = −78.448 | D22 = 1.50 | N12 = 1.74320 | ν12 = 49.3 |
| R23 = 27.505 | D23 = 8.82 | | |
| R24 = −40.095 | D24 = 1.50 | N13 = 1.77250 | ν13 = 49.6 |
| R25 = −169.763 | D25 = 1.10 | | |
| R26 = 57.673 | D26 = 10.27 | N14 = 1.51742 | ν14 = 52.4 |
| R27 = −19.730 | D27 = 1.80 | N15 = 1.48749 | ν15 = 70.2 |
| R28 = −85.147 | | | |

-continued

| Numerical Example 4 | | | | |
|---|---|---|---|---|
| (Aspherical Coefficient) | | | | |
| (Conic Constant)(k) k | (4th Coefficent)(B) B | (6th Coefficient)(C) C | (8th Coefficent)(D) D | (10th Coefficient)(E) E |
| 7th Surface  8.079791E+00 | 1.593000E−07 | −3.063530E−11 | 1.504290E−15 | −1.865300E−18 |

| Numerical Example 5 | | | |
|---|---|---|---|
| f = 294 | Fno = 4.14 | 2ω = 8.42° | |
| R1 = ∞ | D1 = 3.30 | N1 = 1.58600 | ν1 = 58.6 |
| R2 = ∞ | D2 = 0.15 | | |
| R3 = 112.548 | D3 = 9.52 | N2 = 1.55843 | ν2 = 64.0 |
| R4 = −335.760 | D4 = 0.15 | | |
| R5 = 61.421 | D5 = 5.87 | N3 = 1.62227 | ν3 = 60.1 |
| R6 = 95.489 | D6 = 4.57 | NGNL 1 = 1.69590 | νGNL 1 = 17.7 |
| R7 = 499.700 | D7 = 0.92 | | |
| R8 = 1587.380 | D8 = 3.40 | N4 = 1.85000 | ν4 = 23.0 |
| R9 = 45.822 | D9 = 4.14 | | |
| R10 = 44.645 | D10 = 8.35 | N5 = 1.71180 | ν5 = 51.0 |
| R11 = 118.575 | D11 = 4.51 | | |
| R12 = 34.739 | D12 = 4.81 | N6 = 1.62000 | ν6 = 60.3 |
| R13 = 28.293 | D13 = 21.32 | | |
| R14 = ∞ (Aperture Stop) | D14 = 2.63 | | |
| R15 = 93.808 | D15 = 4.14 | N7 = 1.71860 | ν7 = 27.5 |
| R16 = −126.099 | D16 = 2.00 | N8 = 1.88500 | ν8 = 41.0 |
| R17 = 51.473 | D17 = 20.82 | | |
| R18 = 87.907 | D18 = 2.40 | N9 = 1.85000 | ν9 = 23.0 |
| R19 = 31.110 | D19 = 7.22 | N10 = 1.59105 | ν10 = 38.1 |
| R20 = −47.939 | D20 = 0.15 | | |
| R21 = 175.369 | D21 = 4.58 | N11 = 1.84876 | ν11 = 23.0 |
| R22 = −38.666 | D22 = 2.40 | N12 = 1.88500 | ν12 = 41.0 |
| R23 = 31.994 | D23 = 5.72 | | |
| R24 = −24.511 | D24 = 2.40 | N13 = 1.78000 | ν13 = 50.0 |
| R25 = −39.090 | D25 = 3.79 | | |
| R26 = 60.515 | D26 = 7.83 | N14 = 1.61268 | ν14 = 35.4 |
| R27 = −29.650 | D27 = 2.40 | N15 = 1.85000 | ν15 = 23.0 |
| R28 = −66.516 | | | |

| Numerical Example 6 | | | |
|---|---|---|---|
| f = 294 | Fno = 4.14 | 2ω = 8.42° | |
| R1 = ∞ | D1 = 3.30 | N1 = 1.58600 | ν1 = 58.6 |
| R2 = ∞ | D2 = 0.15 | | |
| R3 = 167.935 | D3 = 8.12 | N2 = 1.67492 | ν2 = 55.7 |
| R4 = −257.202 | D4 = 0.15 | | |
| R5 = 76.629 | D5 = 7.34 | N3 = 1.59921 | ν3 = 61.4 |
| R6 = 250.526 | D6 = 1.34 | NGNL 1 = 1.83367 | νGNL 1 = 15.8 |
| R7 = 691.736 | D7 = 2.85 | | |
| R8 = −732.714 | D8 = 3.40 | N4 = 1.85000 | ν4 = 23.0 |
| R9 = 87.038 | D9 = 0.15 | | |
| R10 = 49.183 | D10 = 7.33 | N5 = 1.56882 | ν5 = 53.2 |
| R11 = 105.146 | D11 = 11.35 | | |
| R12 = 38.634 | D12 = 4.00 | N6 = 1.88500 | ν6 = 41.0 |
| R13 = 30.164 | D13 = 11.32 | | |
| R14 = ∞ (Aperture Stop) | D14 = 2.11 | | |
| R15 = 83.916 | D15 = 7.13 | N7 = 1.68280 | ν7 = 29.5 |
| R16 = −402.283 | D16 = 2.00 | N8 = 1.88500 | ν8 = 41.0 |
| R17 = 55.756 | D17 = 28.31 | | |
| R18 = 134.939 | D18 = 2.40 | N9 = 1.85000 | ν9 = 23.0 |
| R19 = 32.512 | D19 = 6.41 | N10 = 1.61512 | ν10 = 35.1 |
| R20 = −50.894 | D20 = 0.15 | | |
| R21 = 198.241 | D21 = 4.25 | N11 = 1.83376 | ν11 = 23.4 |
| R22 = −40.043 | D22 = 2.40 | N12 = 1.88500 | ν12 = 41.0 |
| R23 = 37.448 | D23 = 4.99 | | |

-continued

Numerical Example 6

| | | | |
|---|---|---|---|
| R24 = −25.819 | D24 = 2.40 | N13 = 1.78000 | ν13 = 50.0 |
| R25 = −42.926 | D25 = 6.52 | | |
| R26 = 74.918 | D26 = 7.23 | N14 = 1.63510 | ν14 = 33.1 |
| R27 = −31.363 | D27 = 2.40 | N15 = 1.85000 | ν15 = 23.0 |
| R28 = −68.516 | | | |

Numerical Example 7 f = 294    Fno = 4.14    2ω = 8.42°

| | | | |
|---|---|---|---|
| R1 = ∞ | D1 = 3.30 | N1 = 1.58600 | ν1 = 58.6 |
| R2 = ∞ | D2 = 0.15 | | |
| R3 = 141.718 | D3 = 8.48 | N2 = 1.69210 | ν2 = 54.6 |
| R4 = −300.981 | D4 = 0.15 | | |
| R5 = 69.712 | D5 = 7.54 | N3 = 1.57006 | ν3 = 63.2 |
| R6 = 201.290 | D6 = 0.39 | NGNL 1 = 2.30377 | νGNL 1 = 13.8 |
| R7 = 237.036 | D7 = 2.83 | | |
| R8 = −2755.213 | D8 = 3.40 | N4 = 1.86309 | ν4 = 27.7 |
| R9 = 104.369 | D9 = 14.07 | | |
| R10 = 49.329 | D10 = 7.09 | N5 = 1.55090 | ν5 = 45.1 |
| R11 = 144.149 | D11 = 0.15 | | |
| R12 = 49.353 | D12 = 4.00 | N6 = 1.85000 | ν6 = 23.0 |
| R13 = 33.679 | D13 = 11.16 | | |
| R14 = ∞ (Aperture Stop) | D14 = 1.61 | | |
| R15 = 74.687 | D15 = 8.61 | N7 = 1.65355 | ν7 = 31.6 |
| R16 = −606.849 | D16 = 2.00 | N8 = 1.88500 | ν8 = 41.0 |
| R17 = 53.605 | D17 = 28.29 | | |
| R18 = 139.465 | D18 = 2.40 | N9 = 1.85000 | ν9 = 23.0 |
| R19 = 32.762 | D19 = 6.41 | N10 = 1.57141 | ν10 = 41.1 |
| R20 = −51.644 | D20 = 0.15 | | |
| R21 = 740.343 | D21 = 4.31 | N11 = 1.84492 | ν11 = 26.4 |
| R22 = −34.934 | D22 = 2.40 | N12 = 1.78000 | ν12 = 50.0 |
| R23 = 38.787 | D23 = 4.84 | | |
| R24 = −27.519 | D24 = 2.40 | N13 = 1.62000 | ν13 = 60.3 |
| R25 = −44.237 | D25 = 9.68 | | |
| R26 = 63.437 | D26 = 6.30 | N14 = 1.56293 | ν14 = 42.6 |
| R27 = −43.809 | D27 = 2.40 | N15 = 1.88500 | ν15 = 41.0 |
| R28 = −100.524 | | | |

TABLE 1

| | (UV-Curing Resin 1) | (UV-Curing Resin 2) | N-Polyvinyl-carbazole | TiO₂ |
|---|---|---|---|---|
| d-line Refractive Index | 1.63555 | 1.52415 | 1.69591 | 2.30377 |
| g-line Refractive Index | 1.67532 | 1.53706 | 1.75164 | 2.45676 |
| C-line Refractive Index | 1.62807 | 1.52116 | 1.68528 | 2.28032 |

TABLE 1-continued

| | (UV-Curing Resin 1) | (UV-Curing Resin 2) | N-Polyvinyl-carbazole | TiO₂ |
|---|---|---|---|---|
| F-line Refractive Index | 1.65604 | 1.53133 | 1.72465 | 2.37452 |
| νd | 22.7 | 51.6 | 17.7 | 13.8 |
| θgd | 1.422 | 1.269 | 1.415 | 1.624 |
| θgF | 0.689 | 0.563 | 0.686 | 0.873 |

TABLE 2

| | Numerical Example 1 UV-Curing Resin 1 | Numerical Example 2 TiO₂ 20% - UV-Curing Resin 1 | Numerical Example 3 TiO₂ 20% - UV-Curing Resin 2 | Numerical Example 4 TiO₂ 3% - UV-Curing Resin 2 | Numerical Example 5 N-Polyvinyl-carbazole | Numerical Example 6 TiO₂ 20% - N-Polyvinyl-carbazole | Numerical Example 7 TiO₂ |
|---|---|---|---|---|---|---|---|
| d-line Refractive Index | 1.63555 | 1.78927 | 1.70877 | 1.55324 | 1.69591 | 1.83367 | 2.30377 |
| g-line Refractive Index | 1.67532 | 1.85809 | 1.75988 | 1.57249 | 1.75164 | 1.91351 | 2.45676 |
| C-line Refractive Index | 1.62807 | 1.77777 | 1.70033 | 1.54936 | 1.68528 | 1.81991 | 2.28032 |

TABLE 2-continued

|  | Numerical Example 1 UV-Curing Resin 1 | Numerical Example 2 TiO$_2$ 20% - UV-Curing Resin 1 | Numerical Example 3 TiO$_2$ 20% - UV-Curing Resin 2 | Numerical Example 4 TiO$_2$ 3% - UV-Curing Resin 2 | Numerical Example 5 N-Polyvinyl-carbazole | Numerical Example 6 TiO$_2$ 20% - N-Polyvinyl-carbazole | Numerical Example 7 TiO$_2$ |
|---|---|---|---|---|---|---|---|
| F-line Refractive Index | 1.65604 | 1.82254 | 1.73310 | 1.56326 | 1.72465 | 1.87272 | 2.37452 |
| vd | 22.7 | 17.6 | 21.6 | 39.8 | 17.7 | 15.8 | 13.8 |
| θgd | 1.422 | 1.537 | 1.559 | 1.385 | 1.415 | 1.512 | 1.624 |
| θgF | 0.689 | 0.794 | 0.817 | 0.665 | 0.686 | 0.773 | 0.873 |

TABLE 3

| Conditional Expressions | | Numerical Examples | | | | | | |
|---|---|---|---|---|---|---|---|---|
| | | 1 | 2 | 3 | 4 | 5 | 6 | 7 |
| (2) | θgF(GNL) | 0.689 | 0.794 | 0.817 | 0.665 | 0.686 | 0.773 | 0.873 |
| (6) | vd(GNL) | 22.7 | 17.6 | 21.6 | 39.8 | 17.7 | 15.8 | 13.8 |
| (8) | θgd(GNL) | 1.422 | 1.537 | 1.559 | 1.385 | 1.415 | 1.512 | 0.624 |
| | ψ(GNL) | 0.0049235 | 0.0015758 | 0.0019016 | 0.0083160 | 0.0059225 | 0.0021254 | 0.0009828 |
| | ψ | 0.0034014 | 0.0034018 | 0.0034023 | 0.0034014 | 0.0034016 | 0.0034014 | 0.0034013 |
| (3) | ψ(GNL)/ψ | 1.4474922 | 0.4632254 | 0.5589160 | 2.4448756 | 1.7410924 | 0.6248604 | 0.2889483 |
| (4) | θgF(N) | 0.586256 | 0.608495 | 0.604576 | 0.601513 | 0.575272 | 0.592463 | 0.604309 |
| (5) | vd(P) | 63.80 | 51.97 | 55.13 | 55.80 | 58.37 | 56.77 | 54.30 |

Next, an exemplary embodiment in which the optical systems according to Numerical Examples 1 to 7 are applied to the photographic device will be described with reference to FIG. 16.

Figure 16:
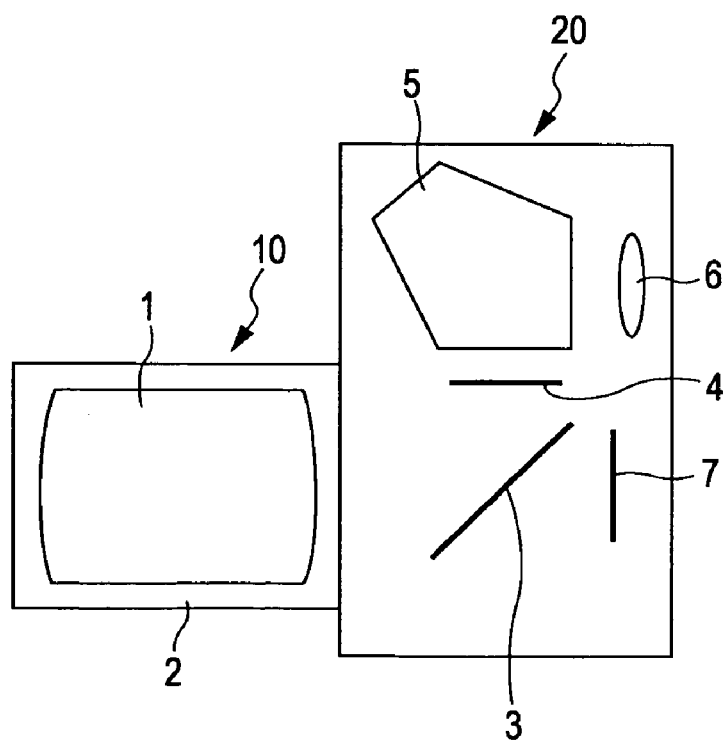
FIG. 16 is a schematic illustration showing a primary portion of a photographic device according to at least one exemplary embodiment.

FIG. 16 is a schematic illustration showing a primary portion of a single-lens reflex camera. In FIG. 16, 10 denotes a photographic lens including the optical system 1 according to at least one of the Numerical Examples 1 to 7.

The optical system 1 is held by a lens barrel 2 as a holder. 20 denotes a camera body, which includes a quick return mirror 3 for reflecting a light beam from a photographic lens 10 upwardly, a focal plane plate 4 disposed on an image formation position of the photographic lens 10, a penta-roof prism 5 which converts an inverse image formed on the focal plane plate 4 into an erect image, and an eyepiece 6 for observing the erect image.

Reference numeral 7 is a photosurface, on which a solid-state image pickup device (photoelectric converter) such as a CCD sensor or a CMOS sensor, or a silver salt film is arranged.

A quick return mirror 3 is retracted from the optical path in shooting, and an image is formed on the photosurface 7 by the photographic lens 10.

The properties described in Numerical Examples 1 to 7 are effectively attained according to the optical apparatus discussed in the present exemplary embodiment.

While the present invention has been described with reference to non-limiting examples of exemplary embodiments, it is to be understood that the invention is not limited to the disclosed exemplary examples and embodiment. The scope of the following claims is to be accorded the broadest interpretation so as to encompass all modifications, equivalent structures and functions.

This application claims the benefit of Japanese Application No. 2005-175496 filed Jun. 15, 2005, which is hereby incorporated by reference herein in its entirety.

What is claimed is:

1. An optical system, comprising:
a refractive optical element including a solid-state material and disposed on a front side relative to an intersection point of an optical axis and a paraxial chief ray, wherein an Abbe number vd(GNL) and a partial dispersion ratio θgF(GNL) of the solid state material meets conditions of:

$-2.100 \times 10^{-3} \cdot vd(GNL) + 0.693 < \theta gF(GNL)$; and $0.555 < \theta gF(GNL) < 0.9$;

a negative lens component disposed on the front side relative to the intersection point; and a positive lens component disposed on the front side relative to the intersection point, wherein a maximum value of a height from the optical axis, at which a paraxial marginal ray passes through lens surfaces on the front side relative to the intersection point, is higher than a maximum value of a height from the optical axis, at which the paraxial marginal ray passes through lens surfaces on a rear side relative to the intersection point, and wherein when a refractive power of the refractive optical element is ψ(GNL), a mean partial dispersion ratio of a material of the negative lens component is θgF(N), a mean Abbe number of a material of the positive lens component is vd(P), and a refractive power of the entire optical system is ψ, the following conditions are met:

$0.03 < \psi(GNL)/\psi < 7.5$;

$0.55 < \theta gF(N) < 0.635$; and $vd(P) < 75$.

2. The optical system according to claim 1, wherein the Abbe number vd(GNL) of the solid-state material meets a condition of:

$vd(GNL) < 60$.

3. The optical system according to claim 1, wherein the partial dispersion ratio θgd(GNL) of the solid-state material meets conditions of:

$$-2.407 \times 10^{-3} \cdot vd(GNL) + 1.420 < \theta gd(GNL); \text{ and}$$

$$1.255 < \theta gd(GNL) < 1.67.$$

4. An optical system, comprising:
an aperture stop;
a refractive optical element including a solid-state material and disposed on a front side relative to the aperture stop, wherein an Abbe number vd(GNL) and a partial dispersion ratio θgF(GNL) of the solid-state material meets conditions of:

$$-2.100 \times 10^{-3} \cdot vd(GNL) + 0.693 < \theta gF(GNL)$$

$$0.555 < \theta gF(GNL) < 0.9;$$

a negative lens component disposed on the front side relative to the aperture stop; and
a positive lens component disposed on the front side relative to the aperture stop,
wherein an overall optical length is shorter than a focal length, and
wherein when a refractive power of the refractive optical element is ψ(GNL), a mean partial dispersion ratio of a material of the negative lens component is θgF(N), a mean Abbe number of a material of the positive lens component is vd(P), and a refractive power of the entire optical system is ψ, the following conditions are met:

$$0.03 < \psi(GNL) < 7.5;$$

$$0.55 < \theta gF(N) < 0.635; \text{ and}$$

$$vd(P) < 75.$$

5. The optical system according to claim 4, wherein the Abbe number vd(GNL) of the solid-state material meets a condition of:

$$vd(GNL) < 60.$$

6. The optical system according to claim 4, wherein the partial dispersion ratio θgd(GNL) of the solid-state material meets conditions of:

$$-2.407 \times 10^{-3} \cdot vd(GNL) + 1.420 < \theta gd(GNL); \text{ and}$$

$$1.255 < \theta gd(GNL) < 1.67.$$

7. An optical apparatus, comprising:
the optical system according to claim 1; and
a photoelectric converter configured to receive an image formed by the optical system.

8. An optical apparatus, comprising:
the optical system according to claim 4; and
a photoelectric converter configured to receive an image formed by the optical system.

9. The optical system according to claim 1, wherein the solid-state material has an absolute value of the change in refractive index (n) with respect to temperature (T) satisfying the following condition:

$$|dn/dT| < 2.5 \times 10^{-4}.$$

10. The optical system according to claim 4, wherein the solid-state material has an absolute value of the change in refractive index (n) with respect to temperature (T) satisfying the following condition:

$$|dn/dT| < 2.5 \times 10^{-4}.$$

* * * * *